United States Patent [19]
Aoshima

[11] Patent Number: 5,831,356
[45] Date of Patent: Nov. 3, 1998

[54] COMPACT CYLINDRICAL STEPPING MOTOR AND ADVANCING DEVICE

[75] Inventor: Chikara Aoshima, Zama, Japan

[73] Assignee: Canon Kabushiki Kaisha, Tokyo, Japan

[21] Appl. No.: 831,863

[22] Filed: Apr. 2, 1997

[30] Foreign Application Priority Data

| Apr. 8, 1996 | [JP] | Japan | 8-111201 |
| Jun. 27, 1996 | [JP] | Japan | 8-186672 |
| Feb. 17, 1997 | [JP] | Japan | 9-048501 |
| Mar. 6, 1997 | [JP] | Japan | 9-069183 |

[51] Int. Cl.$^6$ .................................................. H02K 37/10
[52] U.S. Cl. ........................................ 310/49 R; 310/266
[58] Field of Search ............................... 310/49 A, 49 R, 310/80, 156, 266

[56] References Cited

U.S. PATENT DOCUMENTS

| 3,479,539 | 11/1969 | Brion | 310/49 |
| 4,767,958 | 8/1988 | Sasaki | 310/257 |
| 4,999,559 | 3/1991 | Katz | 318/696 |
| 5,153,626 | 10/1992 | Yamamoto | 354/187 |

FOREIGN PATENT DOCUMENTS

| 273289A | 8/1969 | Germany . |
| 61-128762 | 6/1986 | Japan . |
| 61-128763 | 6/1986 | Japan . |
| 61-254061 | 11/1986 | Japan . |
| 62-141955 | 6/1987 | Japan . |
| 3-180823 | 8/1991 | Japan . |
| 7-015939 | 1/1995 | Japan . |

OTHER PUBLICATIONS

European Search Report dated Aug. 1, 1997.

*Primary Examiner*—Steven L. Stephan
*Assistant Examiner*—Judson H. Jones
*Attorney, Agent, or Firm*—Fitzpatrick, Cella, Harper & Scinto

[57] ABSTRACT

An ultra compact motor, comprises a magnet which is formed in a cylindrical shape and is circumferentially divided into n portions and alternately magnetized into different magnetic poles at least on the external periphery thereof. A first coil, a rotor and a second coil are arranged in this order along the axial direction of the rotor, and first external and internal magnetic poles magnetized by the first coil are arranged so as to oppose respectively the external and internal peripheries of the magnet at an end of the magnet while second external and internal magnetic poles magnetized by the second coil are arranged so as to oppose respectively the external and internal peripheries of the magnet at the other end of the magnet.

26 Claims, 20 Drawing Sheets

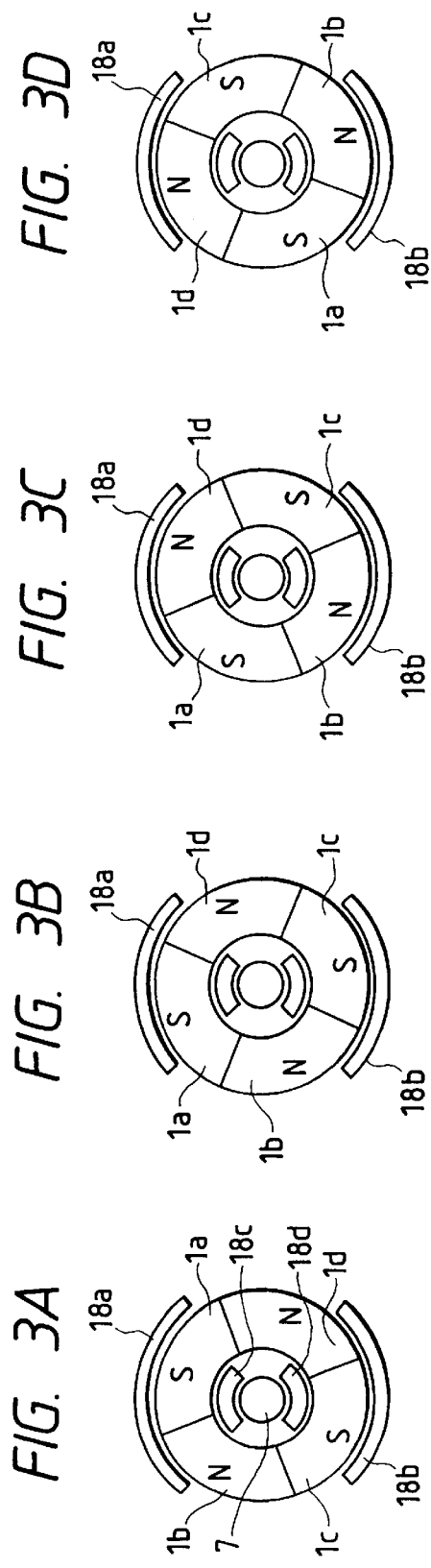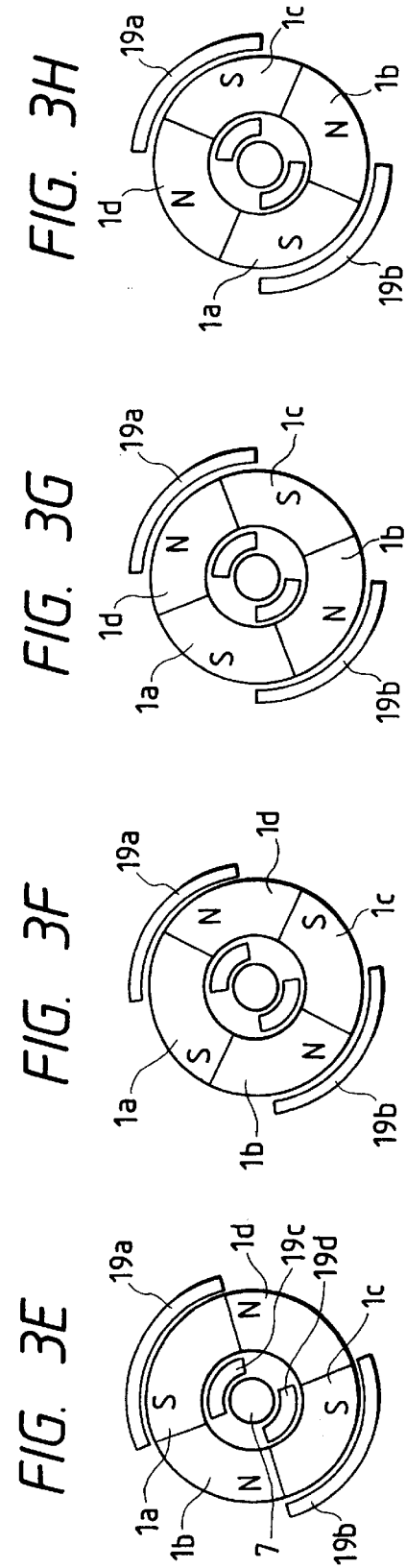

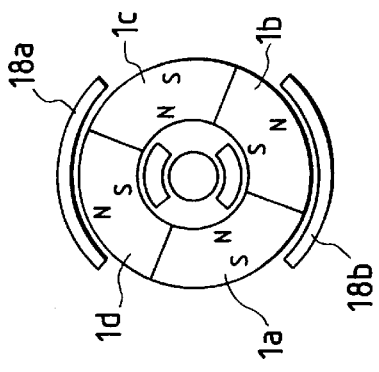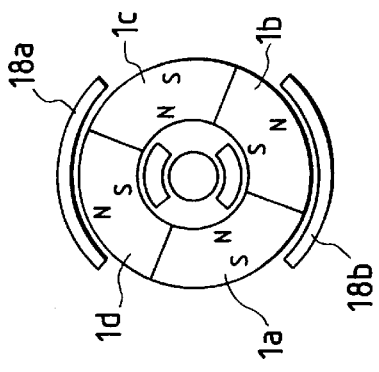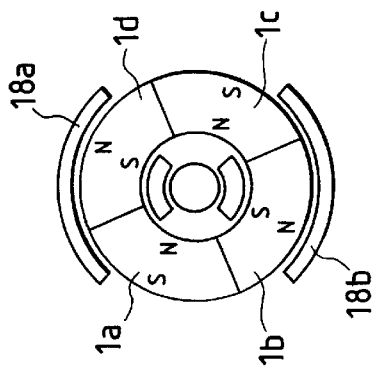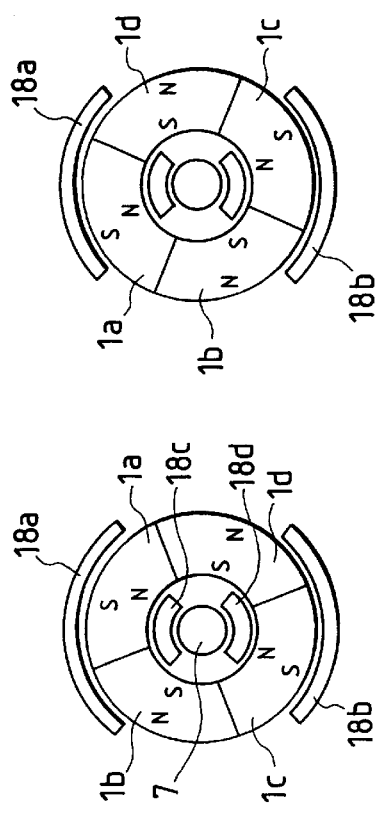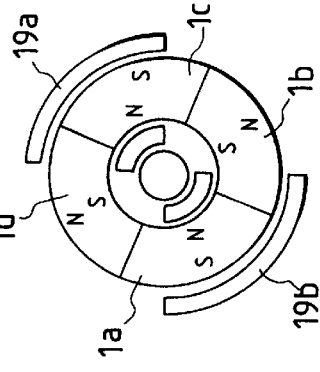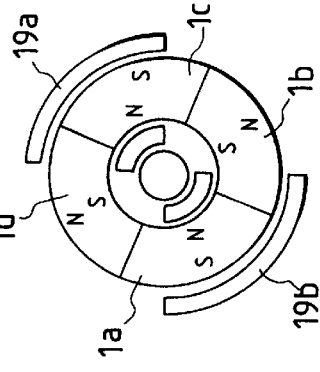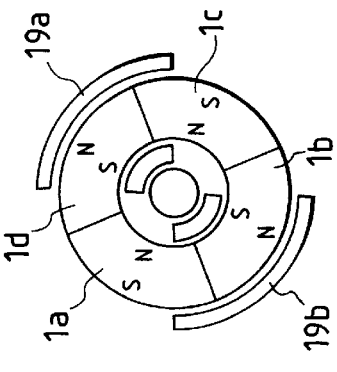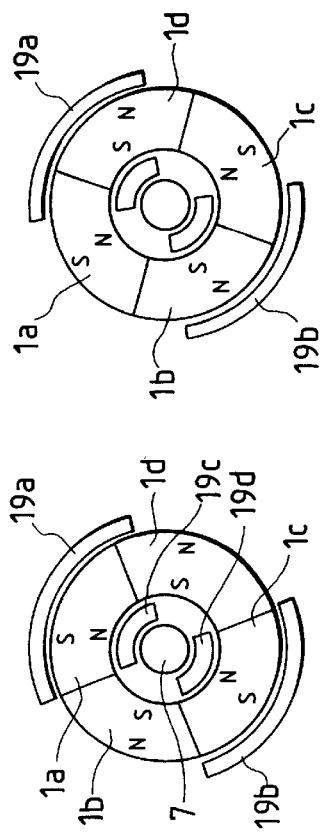

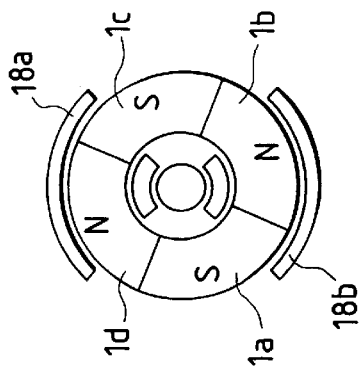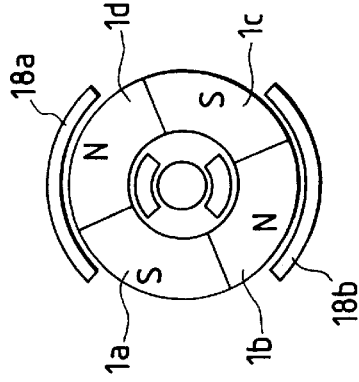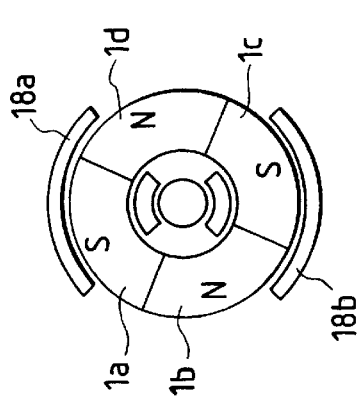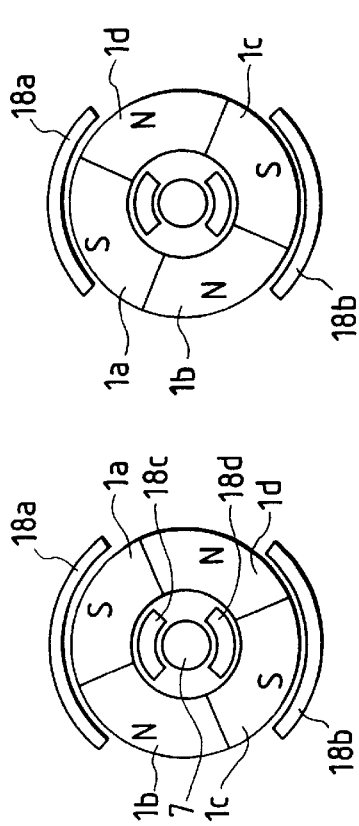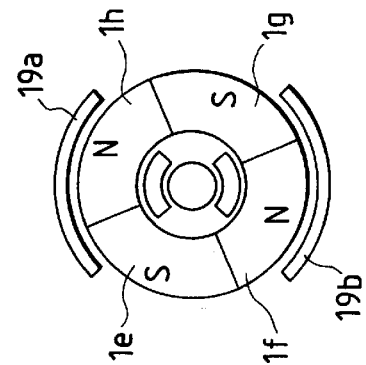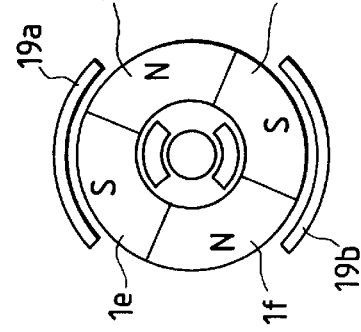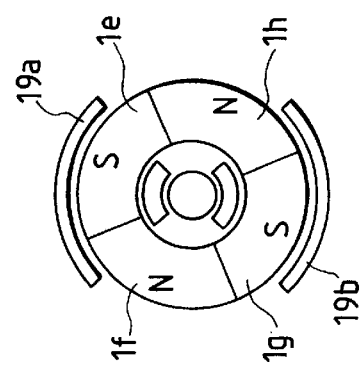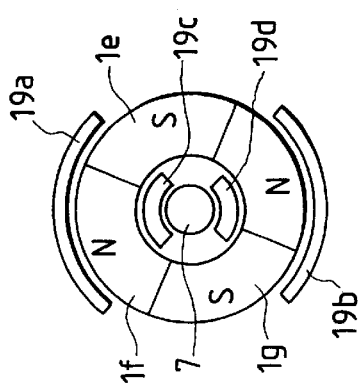

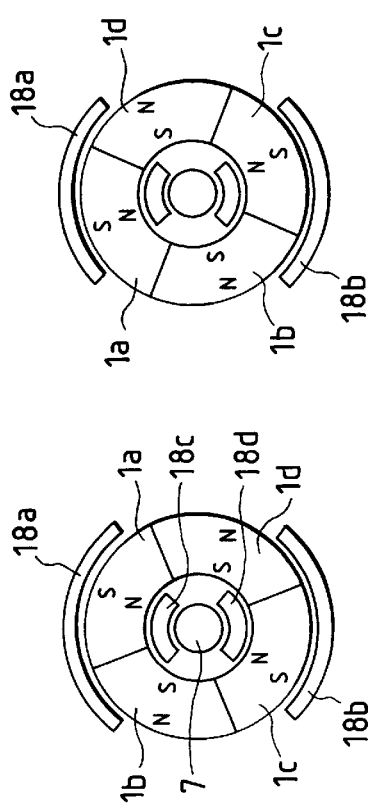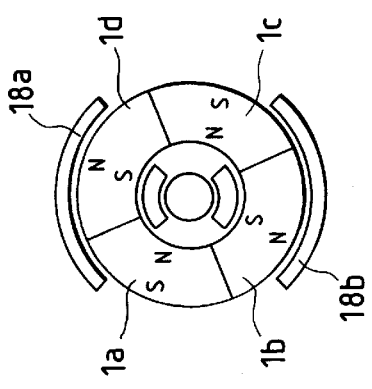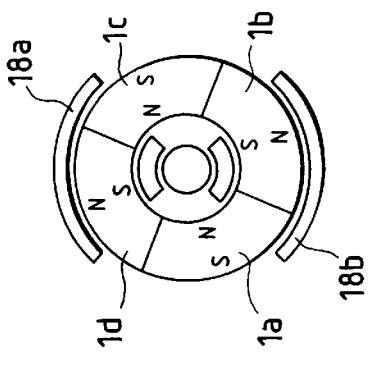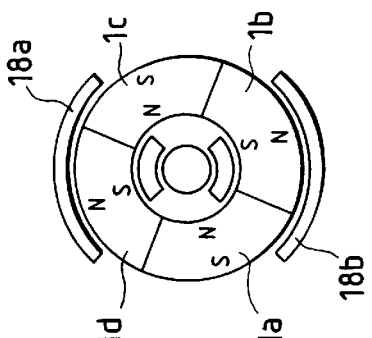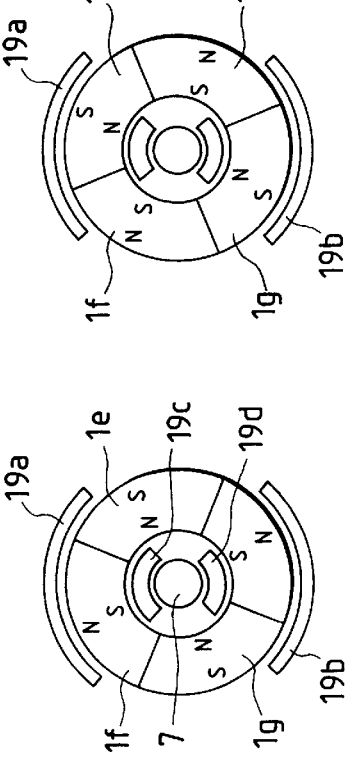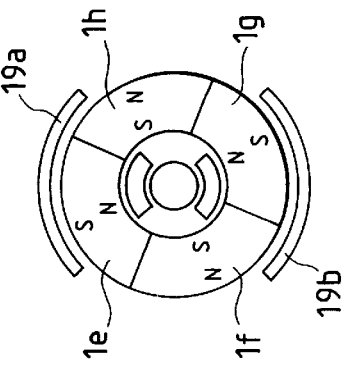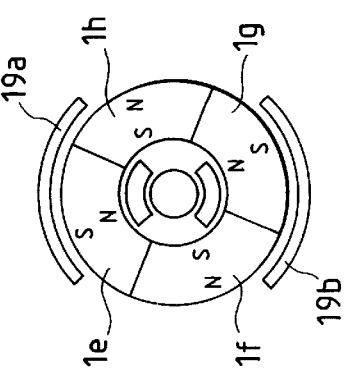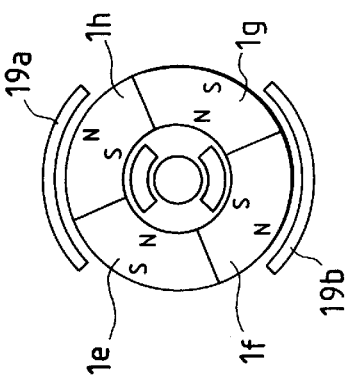

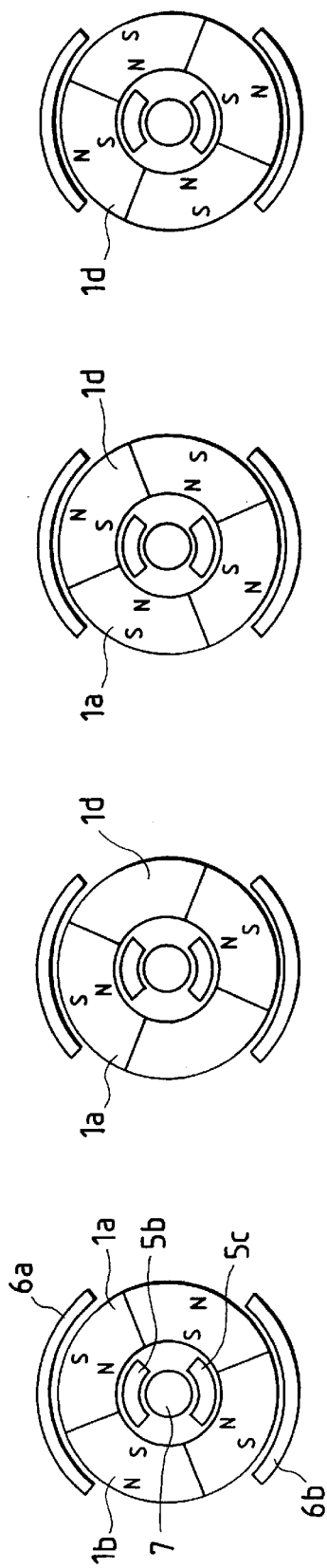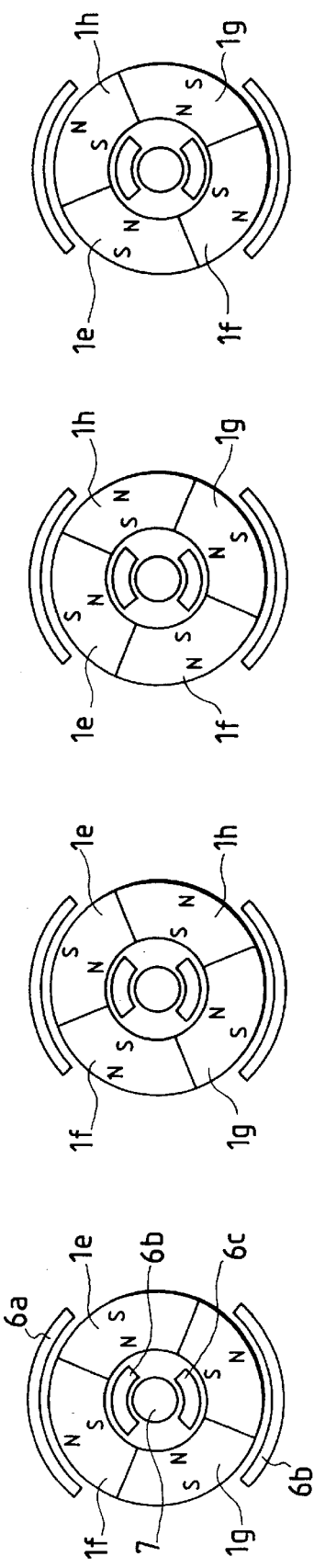

COMPACT CYLINDRICAL STEPPING MOTOR AND ADVANCING DEVICE

BACKGROUND OF THE INVENTION

1. Field of the Invention

The present invention relates to a motor of an ultra compact size and an advancing device utilizing the ultra compact motor for lens advancement.

2. Related Background Art

In the field of compact motors, there is for example known a compact cylindrical stepping motor as shown in FIG. 31. In such a motor, stator coils are wound on bobbins 101, which are supported and fixed in the axial direction between two stator yokes 106. The stator yokes 106 are provided with stator teeth 106a and 106b which are alternately arranged along the internal circumference of the bobbins 101. The stator yokes 106 integral with the stator teeth 106a, 106b are fixed in cases 103 to constitute stators 102.

In one of the two cases 103 there are fixed a flange 115 and a bearing 108, while another bearing 108 is fixed on the other case 103. A rotor 109 is composed of rotor magnets 111 fixed on a rotor shaft 110, and the rotor magnets 111 provide radially extended gaps with the stator yoke 106a. The rotor shaft 110 is rotatably supported between the two bearings 108. The Japanese Patent Laid-open Application No. 3-180823 discloses the use of such compact stepping motor in driving a camera lens, by positioning an arc-shaped stepping motor alongside a phototaking lens to rotate a female screw by the output shaft of the stepping motor, thereby displacing, in the axial direction, a male screw fixed to a lens holder supporting the phototaking lens.

However the conventional compact stepping motor mentioned above has been associated with a drawback of a large external dimension of the motor because the cases 103, the bobbins 101, the stator coils 105 and the stator yokes 106 are concentrically provided around the rotor. Also the output of such motor is relatively limited because the magnetic flux generated by the energization of the stator coils 105 principally passes between an end face 106a1 of the stator tooth 106a and that 106b1 of the stator tooth 106b as shown in FIG. 32 and it does not effectively applied to the rotor magnets 111.

Also in the conventional lens advancing device, the arc-shaped stepping motor, positioned around the lens, occupies a large area in the circumferential direction, so that it becomes difficult to position other mechanisms, such as an actuator for driving the shutter, in a same plane.

SUMMARY OF THE INVENTION

In consideration of the foregoing, an object of the present invention is to provide an ultra compact motor of a novel configuration.

Another object of the present invention is to provide an ultra compact motor of a configuration allowing easy manufacture.

Still another object of the present invention is to provide a motor having a high driving force despite its compact configuration.

Still another object of the present invention is to provide a compact lens advancing device.

Still other objects of the present invention, and the features thereof, will become fully apparent from the following description of the embodiments.

BRIEF DESCRIPTION OF THE DRAWINGS

FIGS. 3A, 3B, 3C, 3D, 3E, 3F, 3G and 3H are views explaining the rotating operation of the stepping motor shown in FIG. 2;

FIGS. 4A, 4B, 4C, 4D, 4E, 4F, 4G and 4H are views explaining the rotating operation of a stepping motor of an embodiment 2 of the present invention;

FIGS. 18A, 18B, 18C, 18D, 18E, 18F, 18G and 18H are views explaining the rotating operation of the stepping motor shown in FIG. 17;

FIGS. 19A, 19B, 19C, 19D, 19E, 19F, 19G and 19H are views explaining the rotating operation of a stepping motor of an embodiment 8 of the present invention;

FIGS. 22A, 22B, 22C, 22D, 22E, 22F, 22G and 22H are views explaining the rotating operation of the stepping motor shown in FIG. 21;

DESCRIPTION OF THE PREFERRED EMBODIMENTS

Now the present invention will be clarified in detail by embodiments thereof, shown in the attached drawings.
[Embodiment 1]

Figure 1:
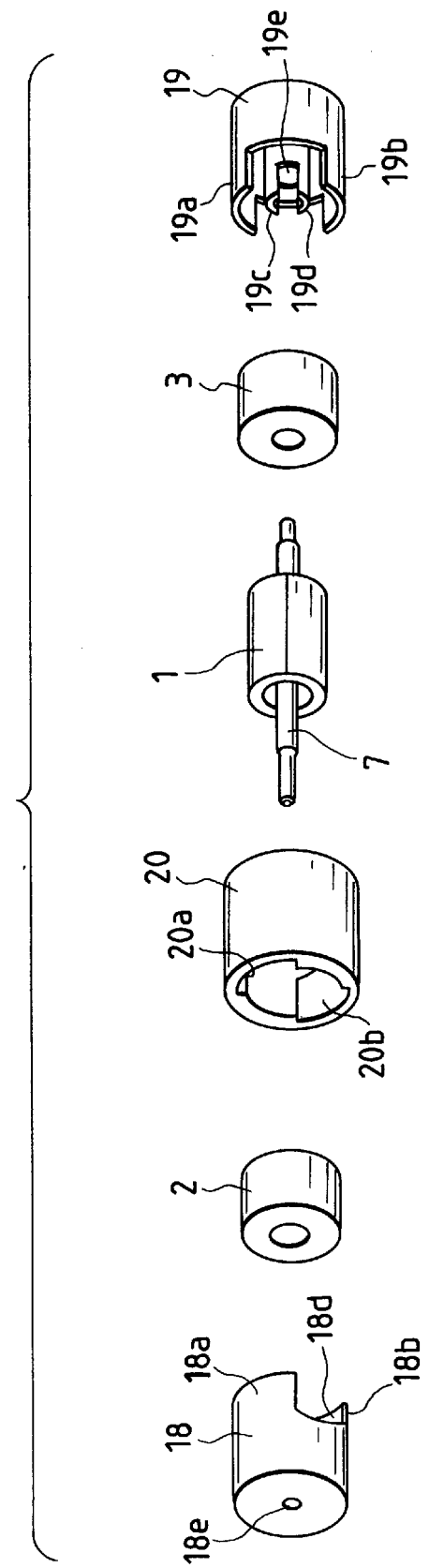
FIG. 1 is an exploded perspective view of a stepping motor constituting an embodiment 1 of the present invention.
Figure 2:
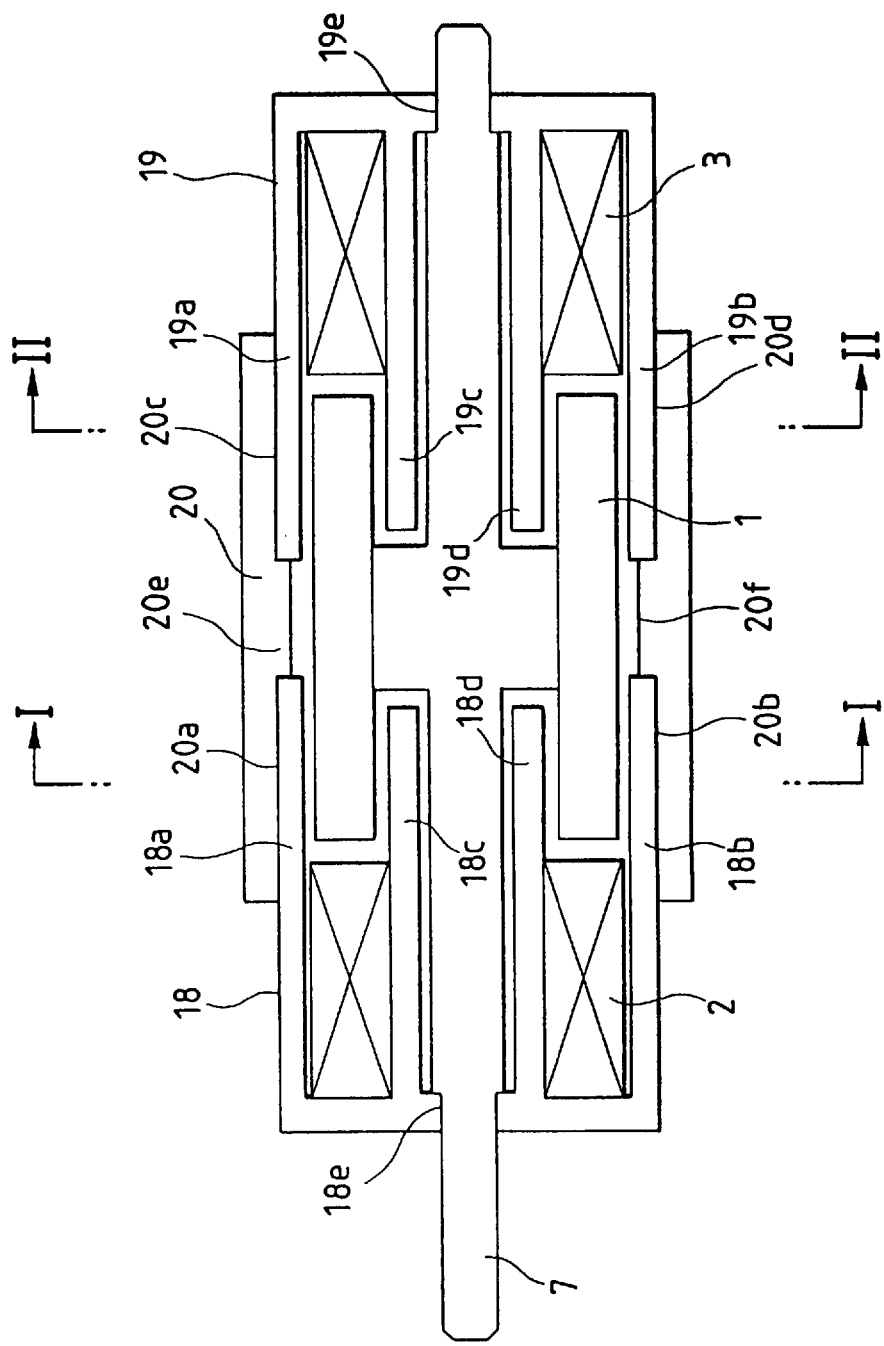
FIG. 2 is a cross-sectional view, in the assembled state, of the stepping motor shown in FIG. 1.

FIGS. 1, 2 and 3A to 3H illustrate the stepping motor of an embodiment 1 of the present invention, and are respectively an exploded perspective view of the stepping motor, a cross-sectional view in the axial direction in the assembled state thereof, and cross-sectional views along lines I—I and II—II in FIG. 2.

Referring to FIGS. 1, 2 and 3A to 3H, a hollow cylindrical magnet 1 constituting the rotor is circumferentially divided, on the external periphery thereof, into alternately magnetized portions (4 portions 1a, 1b, 1c, 1d in the present embodiment), in which portions 1a and 1b are magnetized as S poles and portions 1c and 1d are magnetized as N poles. An output shaft 7 constituting the shaft of the rotor is fixed to the magnet 1. The rotor is constituted by the output shaft 7 and the magnet 1. Coils 2, 3 are provided concentrically with the above-mentioned magnet 1, in positions axially sandwiching the magnet 1, and have an external diameter approximately equal to that of the magnet 1.

First and second stators 18, 19 composed of a soft magnetic material, are positioned with mutual displacement of 180°/n or 45°. Each of the first and second stators 18, 19 is composed of an outer tube and an inner tube. Between the outer and inner tubes of the first stator 18 there is provided a coil 2, which, under current supply, magnetizes the first stator 18. The outer and inner tubes of the first stator 18 constitute, at an end portion thereof, outer magnetic poles 18a, 18b and inner magnetic poles 18c, 18d. The inner magnetic poles 18c, 18d are mutually displaced by 360°/(n/2) or 180° in order to assume a same phase. The outer magnetic pole 18a is provided in a position opposed to the inner magnetic pole 18c, and the outer magnetic pole 18b is provided in a position opposed to the inner magnetic pole 18d.

The outer magnetic poles 18a, 18b and the inner magnetic poles 18c, 18d of the first stator 18 are provided in positions respectively opposed to the external and internal peripheries at an end portion of the magnet 1, so as to sandwich such end portion of the magnet 1. An end of the rotary shaft 7 is rotatably fitted in a hole 18e of the first stator 18.

Between the outer and inner tubes of the second stator 19 there is provided a coil 3, which, under current supply, magnetizes the second stator 19. The outer and inner tubes of the second stator 19 constitute, at an end portion thereof, outer magnetic poles 19a, 19b and inner magnetic poles 19c, 19d. The inner magnetic poles 19c, 19d are mutually displaced by 360°/(n/2) or 180° in order to assume a same phase. The outer magnetic pole 19a is provided in a position opposed to the inner magnetic pole 19c, and the outer magnetic pole 19b is provided in a position opposed to the inner magnetic pole 19d. The outer magnetic poles 19a, 19b and the inner magnetic poles 19c, 19d of the second stator 19 are provided in positions respectively opposed to the external and internal peripheries at the other end portion of the magnet 1, so as to sandwich the other end portion of the magnet 1. The other end of the rotary shaft 7 is rotatably fitted in a hole 19e of the second stator 19.

Consequently the magnetic flux generated by the coil 2 crosses the magnet 1 between the outer magnetic poles 18a, 18b and the inner ones 18c, 18d, thus effectively acting on the magnet 1 constituting the rotor. Also the magnetic flux generated by the coil 3 crosses the magnet 1 between the outer magnetic poles 19a, 19b and the inner ones 19c, 19d, thus effectively acting on the magnet 1 and increasing the output of the motor.

A coupling ring 20, composed of a cylindrical member of a non-magnetic material, is provided, at an end on the internal periphery, with grooves 20a, 20b, and at the other end, with grooves 20c, 20d which are displaced in phase by 45° from the grooves 20a, 20b, respectively. The outer magnetic poles 18a, 18b of the first stator 18 are fitted in the grooves 20a, 20b while the outer magnetic poles 19a, 19b of the second stator 19 are fitted in the grooves 20c, 20d and such fitted portions are fixed with an adhesive material to mount the first and second stators 18, 19 on the coupling ring 20. The first and second stators 18, 19 are fixed on the coupling ring 20 so that the ends of the outer magnetic poles 18a, 18b and the inner magnetic poles 18c, 18d are respectively opposed to those of the outer magnetic poles 19a, 19b and the inner magnetic poles 19c, 19d and that the outer magnetic poles 18a, 18b and 19a, 19b are mutually separated by the width of internal projections 20e, 20f of the coupling ring 20.

FIG. 2 is a cross-sectional view of the stepping motor and, FIGS. 3A, 3B, 3C and 3D are cross-sectional views along a line I—I in FIG. 2, while FIGS. 3E, 3F, 3G and 3H are cross-sectional views along a line II—II in FIG. 2. In FIGS. 3A and 3E are cross-sectional views at a same timing, also FIGS. 3B and 3F are those of a same timing, FIGS. 3C and 3G are those of a same timing, and FIGS. 3D and 3H are also those of a same timing.

In the following there will be explained the function of the stepping motor of the present embodiment. In a state shown in FIGS. 3A and 3E, the coils 2 and 3 are energized so as to magnetize the outer magnetic poles 18a, 18b of the first stator 18 as N poles, the inner magnetic poles 18c, 18d as S poles, the outer magnetic poles 19a, 19b of the second stator 19 as S poles and the inner magnetic poles 19c, 19d as N poles, whereby the magnet 1 constituting the rotor rotates counterclockwise by 45° to reach a state shown in FIGS. 3B and 3F.

Then the current supply to the coil 2 is inverted to magnetize the outer magnetic poles 18a, 18b of the first stator 18 as S poles, the inner magnetic poles 18c, 18d as N poles, the outer magnetic poles 19a, 19b of the second stator 19 as S poles and the inner magnetic poles 19c, 19d as N poles, whereby the magnet 1 constituting the rotor further rotates counterclockwise by 45° to reach a state shown in FIGS. 3C and 3G.

Then the current supply to the coil 3 is inverted to magnetize the outer magnetic poles 19a, 19b of the second stator 19 as S poles, the inner magnetic poles 19c, 19d as N poles, the outer magnetic poles 18a, 18b of the first stator 18 as S poles and the inner magnetic poles 18c, 18d as N poles, whereby the magnet 1 constituting the rotor further rotates counterclockwise by 45° to reach a state shown in FIGS. 3D and 3H. Thereafter the current supplies to the coils 2, 3 are switched in succession whereby the magnet 1 of the rotor rotates to positions corresponding to the phases of the current supply.

In the following there will be explained why the above-explained configuration is optimum for realizing an ultra compact stepping motor.

The basic configuration of the stepping motor is featured by:

1) hollow cylindrical structure of the magnet;
2) alternate magnetization of n portions, formed by dividing the external periphery of the magnet;
3) arrangement of the first coil, the magnet and the second coil in the axial direction of the magnet; and
4) outer and inner magnetic poles of the first and second stators, respectively magnetized by the first and second coils, are positioned so as to respectively oppose to the external and internal peripheries of the magnet.

Consequently the present stepping motor only requires a diameter sufficient to position the magnetic poles of the stators outside the diameter of the magnet, and an axial length equal to the sum of the lengths of the magnet and those of the first and second coils. As the dimension of the stepping motor is thus determined by the diameter and the length of the magnet and the coils, the motor can be made ultra compact by minimizing such diameter and length.

Such minimization of the diameter and the length of the magnet and the coils renders it difficult to maintain the accuracy of the output of the stepping motor, but this difficulty is overcome by a simple structure in which the magnet is formed into a hollow cylindrical shape and positioned so that the outer and inner magnetic poles of the first and second stators are respectively opposed to the external and internal peripheries of the magnet of such hollow cylindrical shape. The output of the motor can be made more efficient by magnetizing not only the external periphery of the magnet but also the internal periphery thereof, as in the embodiment 2 to be explained later.

[Embodiment 2]

FIGS. 4A to 4H illustrate an embodiment 2 of the present invention. In the foregoing embodiment 1 of the present invention, the magnet 1 constituting the rotor is circumferentially divided into n portions and alternately magnetized on the external periphery thereof, but, in the present embodiment 2, the magnet 1 constituting the rotor is circumferentially divided, not only on the external periphery thereof but also on the internal periphery, into n portions (4 portions in the present embodiment) and alternately magnetized into S and N, in order to improve the output efficiency of the motor. Each portion on the internal periphery of the magnet 1 is magnetized in opposite manner to the adjacent portion on the external periphery thereof. More specifically the internal periphery portions corresponding to the magnetized portions 1a, 1c are magnetized as N poles while those corresponding to the magnetized portions 1b, 1d are magnetized as S poles. In the present embodiment 2, since not only the external periphery of the magnet 1 of the rotor but also the internal periphery thereof are circumferentially divided into n portions and alternately magnetized as N and S poles, the output of the motor can be increased by the relationship between the internal periphery of the magnet 1 and the inner magnetic poles 18c, 18d of the first stator 18 and those 19c, 19d of the second stator 19.

[Embodiment 3]

Figure 5:
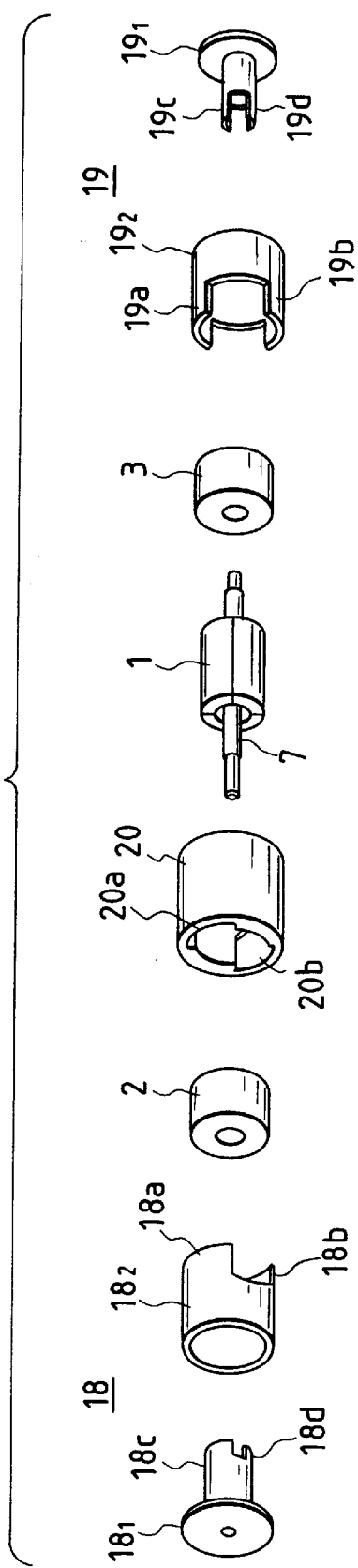
FIG. 5 is an exploded perspective view of a stepping motor of an embodiment 3 of the present invention.

FIG. 5 illustrates an embodiment 3 of the present invention. In contract to the foregoing embodiment 1 where the outer and inner tubes are integrally formed in each of the first and second stators 18, 19, the outer and inner tubes in the present embodiment 3 are separately formed in each of the first and second stators 18, 19 as shown in FIG. 5. More specifically, the inner tube of the first stator 18 constitutes, together with the inner magnetic poles 18c, 18d at the end thereof, a first yoke $18_1$, while the outer tube of the first stator 18 constitutes, together with the outer magnetic poles 18a, 18b at the end thereof, a third yoke $18_2$. Also the inner tube of the second stator 19 constitutes, together with the inner magnetic poles 19c, 19d at the end thereof, a second yoke $19_1$, while the outer tube of the second stator 19 constitutes, together with the outer magnetic poles 19a, 19b at the end thereof, a forth yoke $19_2$. Also in the embodiment 3, the magnet 1 of the rotor may be circumferentially divided into n portions and alternately magnetized in N and S not only on the external periphery but also on the internal periphery as in the embodiment 2, thereby effectively increasing the output of the motor.

[Embodiment 4]

Figure 6:
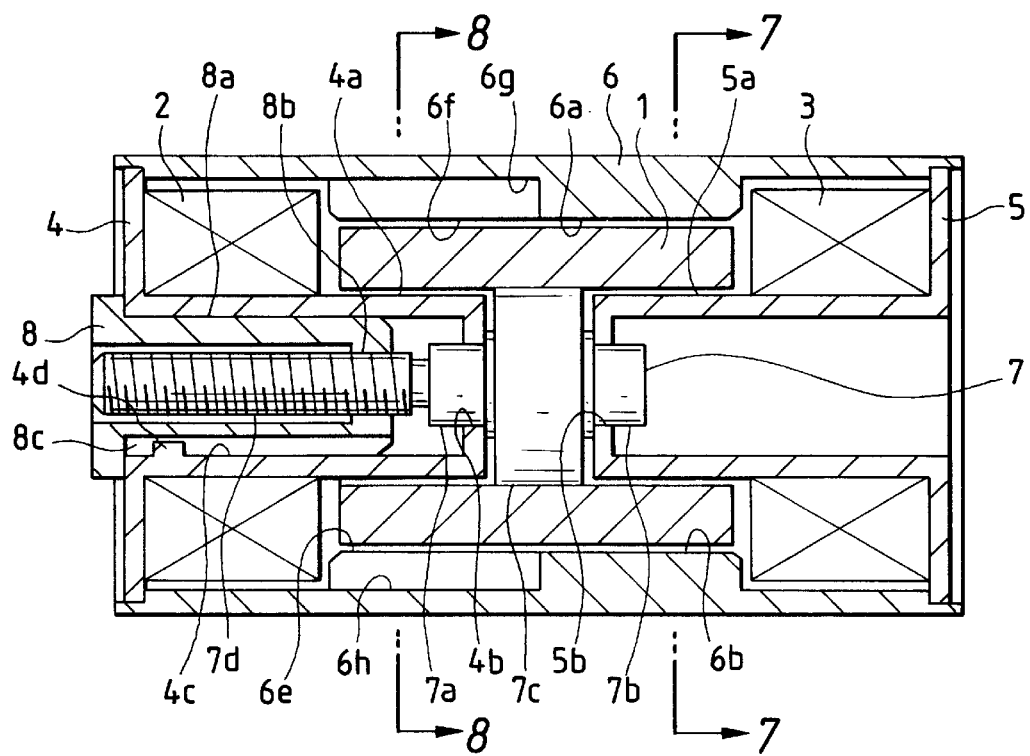
FIG. 6 is a cross-sectional view of a stepping motor of an embodiment 4 of the present invention.
Figure 7:
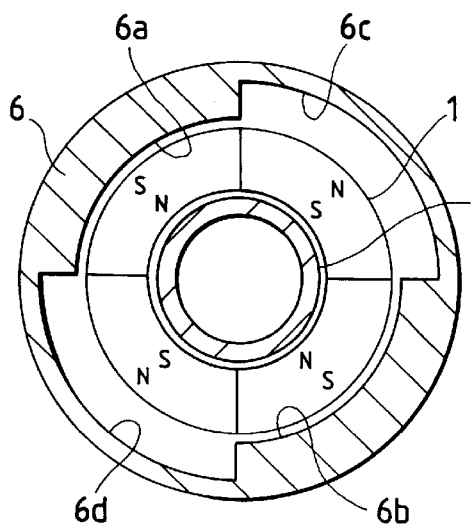
FIG. 7 is a cross-sectional view of the stepping motor shown in FIG. 6, along a line 7—7 therein.
Figure 8:
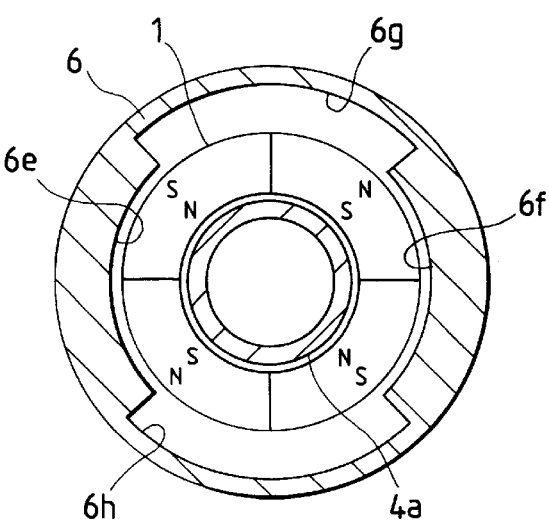
FIG. 8 is a cross-sectional view of the stepping motor shown in FIG. 6, along a line 8—8 therein.

FIGS. 6 to 8 illustrate the stepping motor of an embodiment 4 and are respectively a longitudinal cross-sectional view of the stepping motor, a transversal cross-sectional view along a line 7—7 in FIG. 6 and a transversal cross-sectional view along a line 8—8 in FIG. 6.

Referring to FIGS. 6 to 8, a magnet ring 1 is composed of a ring-shaped permanent magnet, which, as shown in FIGS. 7 and 8, is circumferentially divided into four equal portions and magnetized alternately into N and S poles in the radial direction.

Coils 2, 3 are provided coaxially with the magnet ring 1, in positions on both sides thereof.

A first yoke 4, consisting of a soft magnetic material, is provided with a tubular magnetic pole portion 4a which is inserted into the interior of the coil 2 and opposed to the internal periphery of the magnet ring 1.

A second yoke 5, consisting of a soft magnetic material, is provided with a tubular magnetic pole portion 5a which is inserted into the interior of the coil 3 and opposed to the internal periphery of the magnet ring 1.

A third yoke 6, consisting of a soft magnetic material and having a tubular shape, is constructed so to cover the external peripheries of the coils 2, 3 and the magnet ring 1 as shown in FIG. 6. The third yoke is fixed to the first and second yokes.

An output shaft 7 is fixed, at a larger diameter portion 7c thereof, to the magnet ring 1 and is constructed so as to integrally rotate therewith. The output shaft 7 is rotatably supported, at portions 7a, 7b on both sides of the larger diameter portion 7c, by apertures 4b, 5b of the first and second yokes 4, 5.

A linearly movable tube 8 is slidably fitted, at the external periphery 8a thereof, in the internal periphery 4c of the first yoke 4, and is provided with a female screw portion 8b, which engages with a male screw portion 7d formed on the output shaft 7. The linearly movable tube 8 is further provided with an axial groove 8c, and is rendered movable not in the circumferential direction but only in the axial direction by a pin 4d of the first yoke 4 slidably engaging in the above-mentioned groove 8c. Because of this mechanism, the tube 8 is moved in the axial direction by the rotation of the output shaft 7.

The third yoke 6 is provided with portions 6e, 6f of smaller internal diameters (cf. FIG. 8) opposed to the external periphery of the magnet ring 1, within a range where the magnet ring 1 and the magnetic pole portion 4a of the first yoke 4 substantially overlap in the axial direction and within a predetermined circumferential range. Also there are formed portions 6a, 6b of smaller internal diameters (cf. FIG. 7) opposed to the external periphery of the magnet ring 1, within a range where the magnet ring 1 and the magnetic pole portion 5a of the second yoke 5 substantially overlap in the axial direction and within a predetermined circumferential range. The predetermined circumferential range mentioned above is, in the present embodiment, 90° which is the angular pitch of magnetization of the magnet ring 1.

As shown in FIGS. 7 and 8, the portions 6e, 6f and 6a, 6b of the third yoke 6 are mutually displaced by a phase of 45°. The angle of this phase displacement is preferably 90°/n, wherein 2n is the number of poles of the magnet ring 1. In this embodiment the phase difference is 45° since n=2.

The energization of the coil 2 generates magnetic flux between the magnetic pole portion 4a of the first yoke 4 and the portions 6e, 6f of the third yoke 6, but magnetic flux is scarcely generated between portions 6g, 6h with a larger internal diameter (cf. FIG. 8) and the magnetic pole portion 4a of the first yoke 4.

Similarly the energization of the coil 3 generates magnetic flux between the magnetic pole portion 5a of the second yoke 5 and the portions 6a, 6b of the third yoke 6, but magnetic flux is scarcely generated between portions 6c, 6d with a larger internal diameter (cf. FIG. 7) and the magnetic pole portion 5a of the second yoke 5.

By alternate switching of the direction of the currents supplied to the coils 2, 3, the portions 6a, 6b and 6e, 6f are switched as to N or S poles according to the direction of the currents, whereby the magnet ring 1 is rotated. Thus, the linearly movable tube 8 engaging with the male screw of the output shaft 1 is advanced in the axial direction.

In the present embodiment, the relative positional relationship between the position of the magnetic flux generated by the coil 2 and that of the magnetic flux generated by the coil 3 in the direction of rotation is determined by the relative positional relationship between the portions 6a, 6b and 6e, 6f formed in the single third yoke 6, so that the motor can have an increased precision and can be manufactured with a constant performance regardless of the individual fluctuation in performance.

Also in this embodiment, the coils are provided coaxially (concentrically) with the output shaft so that the entire motor is formed in a tubular shape of a small diameter. Therefore, when it is positioned in the lens barrel of the camera, it occupies a smaller circumferential area in comparison with the arc-shaped stepping motor disclosed for example in the Japanese Patent Laid-open Application No. 3-180823 so that other structural members or driving units such as the shutter can be easily positioned in the same plane.

Figure 9:
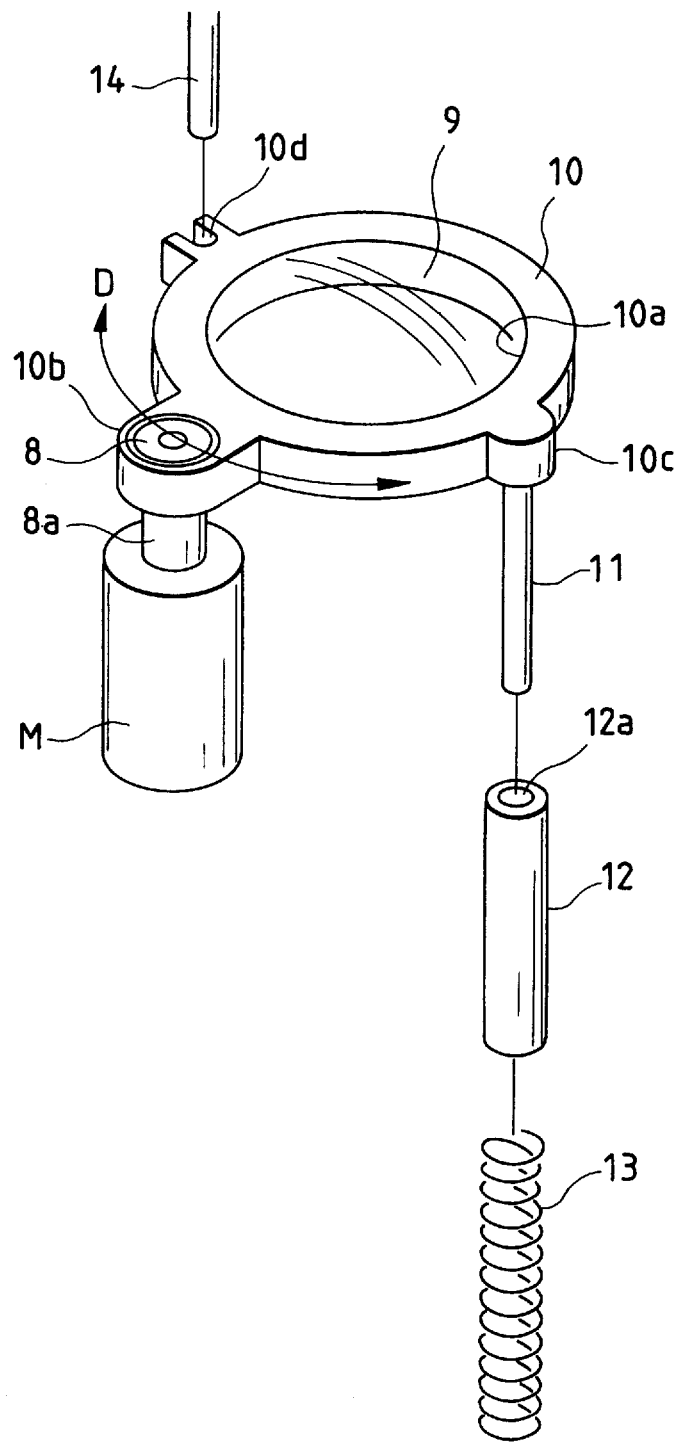
FIG. 9 is an exploded perspective view of an advancing device for displacing the phototaking lens, employing the stepping motor of the foregoing embodiments.

FIG. 9 is an exploded perspective view of an advancing device, utilizing the stepping motor of any of the foregoing embodiments, for displacing the phototaking lens. In such advancing device, the stepping motor is provided in the lens barrel and the phototaking lens is moved in the axial direction by the linearly movable tube 8, through the output shaft of the motor.

In FIG. 9, there are shown a phototaking lens 9 and a lens holder 10, which supports the phototaking lens 9 in the internal periphery 10a. The linearly movable tube 8 is mounted to an ear portion 10b of the lens holder 10, so as to be integrally movable therewith in the axial direction.

A guide shaft 11 is fixed to a projecting portion 10c of the lens holder 10. A guide tube 12 is fixed to the lens barrel (not shown). The guide shaft 11 is slidably fitted in the internal periphery 12a of the guide tube 12 and guides the lens holder 10 movably in the axial direction.

A coil spring 13 is provided between the lens holder 10 and a base plate (not shown) of the lens barrel, exerting a biasing force to separate the lens holder 10 and the base plate of the lens barrel and thereby eliminating the play between the aforementioned output shaft 7 and the first or second yoke 4, 5 and that between the male screw portion 7c of the output shaft 7 and the female screw portion of the linearly movable tube 8. Also the lens holder 10 is prevented from rotation about the guide shaft 11 of the lens holder 10, by slidable engagement of a pin 14, provided on the base plate (not shown), with a U-shaped groove 10d of the lens holder 10.

In the above-explained configuration, the rotation of the output shaft 7 moves the linearly movable tube 8 in the direction of the optical axis, so that the phototaking lens 9 is driven in the axial direction according to the amount of rotation of the output shaft 7. The stepping motor serving as the drive source for the phototaking lens 9 occupies only a relatively small portion in the circumferential direction (indicated by an arrow D) of the lens barrel, so that another driving unit for the shutter may be positioned in the same plane.

The advancing device including the driving source can be realized in a compact form, since the advancing mechanism, consisting of the male screw portion 7d of the output shaft 7 and the female screw portion 8b of the linearly movable tube 8, is contained in the third yoke 6. In the present embodiment, the linearly movable tube 8 is used for driving the lens holder, but it may also be used for driving other movable members such as a lens of the view finder or mask for aperture switching.

In this embodiment 4 of the present invention, the magnet 1 of the rotor is circumferentially divided into n portions and alternately magnetized in S and N poles not only on the external periphery but also on the internal periphery, but it is also possible, as in the embodiment 1, to divide only the external periphery of the magnet 1 into n portions (4 portions in case of the present embodiment) and to alternately magnetize such external periphery.

[Embodiment 5]

Figure 10:
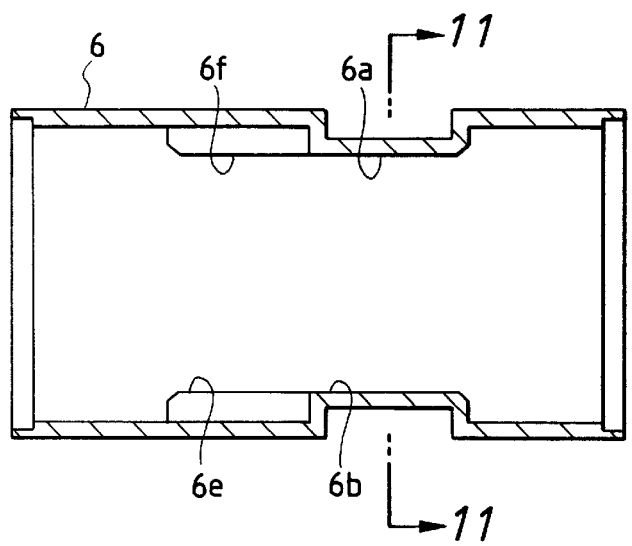
FIG. 10 is a cross-sectional view of a third yoke in a stepping motor of an embodiment 5 of the present invention.
Figure 11:
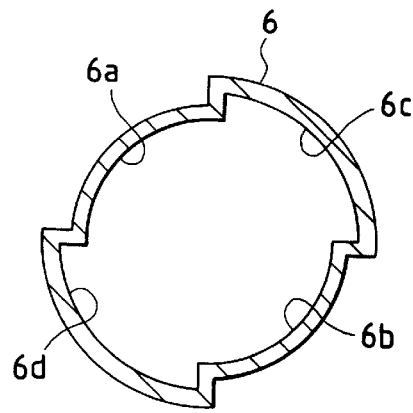
FIG. 11 is a cross-sectional view of the stepping motor shown in FIG. 10, along a line 11—11 therein.
Figure 12:
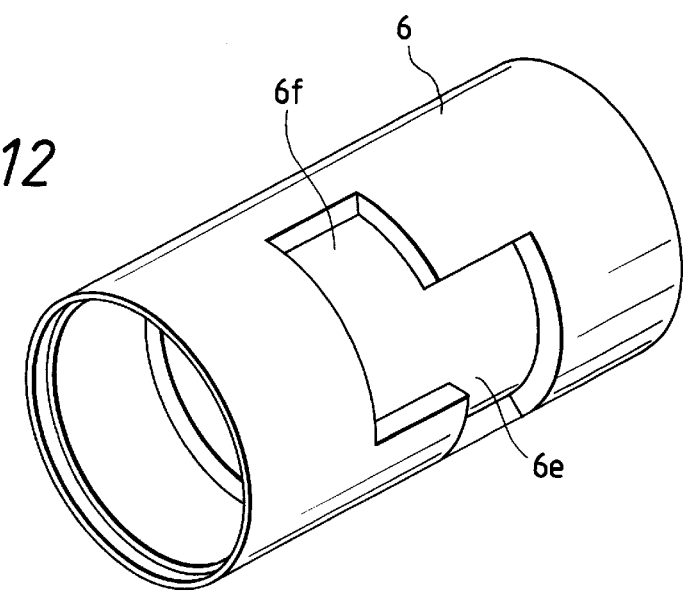
FIG. 12 is a perspective view of the third yoke in the stepping motor shown in FIG. 10.

FIGS. 10 to 12 illustrate the stepping motor of an embodiment 5 of the present invention, and are respectively a longitudinal cross-sectional view showing the third yoke only of the stepping motor, a transversal cross-sectional view along a line 11—11 in FIG. 10, and a perspective view of the third yoke only.

In the third yoke 6 of this embodiment, the portions 6a, 6b, 6f, 6e of smaller internal diameter (inwardly protruding portions) are formed by pressing from the external periphery. This structure provides an advantage of easier manufacture, in comparison with the structure of the embodiment 4.

[Embodiment 6]

Figure 13:
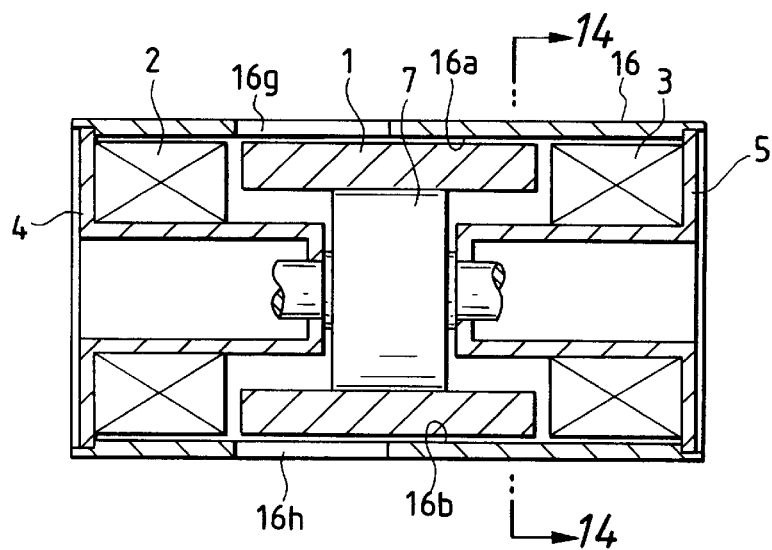
FIG. 13 is a cross-sectional view of a stepping motor of an embodiment 6 of the present invention.
Figure 14:
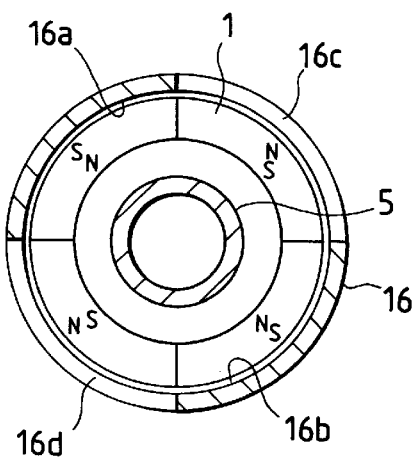
FIG. 14 is a cross-sectional view of the stepping motor shown in FIG. 13, along a line 14—14 therein.
Figure 15:
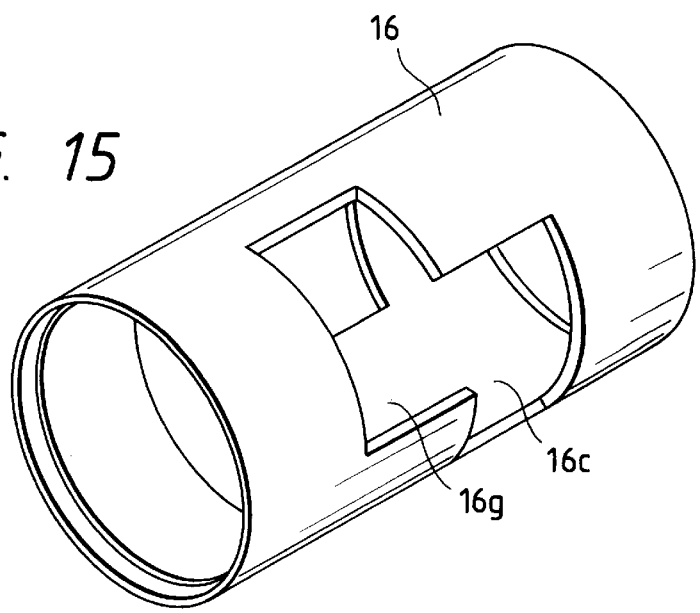
FIG. 15 is a perspective view of the third yoke in the stepping motor shown in FIG. 13.

FIGS. 13 to 15 illustrate the stepping motor of an embodiment 6 of the present invention, and are respectively a longitudinal cross-sectional view of the stepping motor of the embodiment 6, a transversal cross-sectional view along a line 14—14 in FIG. 13, and a perspective view of the third yoke only of the stepping motor.

The embodiment 6 employs a third yoke 16 instead of the third yoke 6 of the embodiment 4. The third yoke 16 is provided, in the axial range explained in connection with the third yoke 6 of the embodiment 4, with apertures 16c, 16d instead of the portions 6c, 6d of larger internal diameter defined by the portions 6a, 6b, and, also in the similar axial range, with apertures 16g, 16h instead of the portions 6g, 6h defined by the portions 6e, 6f. The apertures 16c, 16d and 16g, 16h are circumferentially displaced by 45°. Therefore, the magnetic flux generated by energization of the coil 3 passes between the second yoke 5 and the portions 16a, 16b. This situation corresponds to the relationship in the embodiment 4 between the portions 6a, 6b of the third yoke 6 and the second yoke.

Similarly, the magnetic flux generated by energization of the coil 2 passes between the portions other than the above-mentioned apertures 16g, 16h and the second yoke, corresponding to the positions between the first yoke 4 and the portions 6e, 6f of the third yoke 6 in the embodiment 4.

Thus, the magnet ring 1 can be rotated by switching the direction of the currents supplied to the coils 2, 3 in succession as in the embodiments 4 and 5.

As the third yoke 16 of the embodiment 6 lacks the protruding portions 6a, 6b, 6e, 6f in comparison with the third yoke 6 in the embodiments 4 and 5, the external diameter of the magnet ring 1 can be made correspondingly larger and the output of the motor can thus be increased. The apertures mentioned above may also be provided in the first and second yokes instead of the third yoke.

[Embodiment 7]

Figure 16:
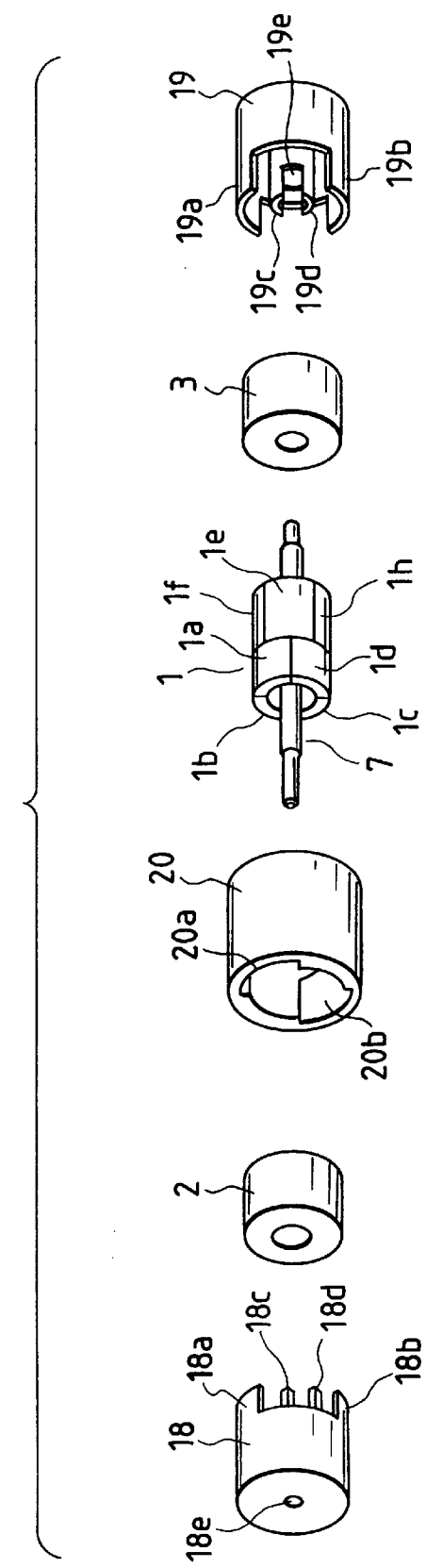
FIG. 16 is an exploded perspective view of a stepping motor of an embodiment 7 of the present invention.
Figure 17:
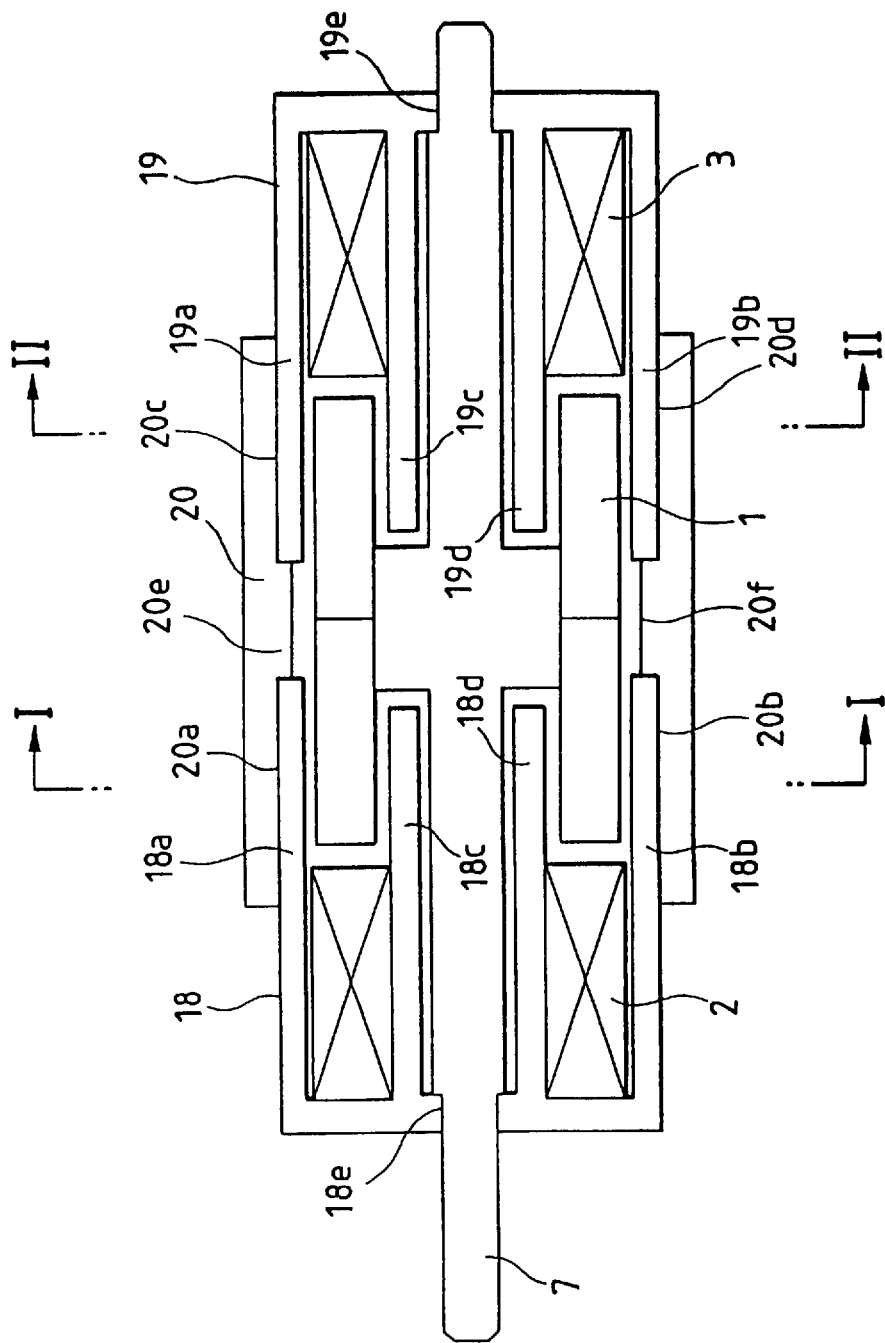
FIG. 17 is a cross-sectional view, in the assembled state, of the stepping motor shown in FIG. 16.

FIGS. 16, 17 and 18A to 18H illustrate the stepping motor of an embodiment 7 of the present invention, and are respectively an exploded perspective view of the stepping motor, a longitudinal cross-sectional view of the stepping motor in the assembled state, and cross-sectional views along lines I—I and II—II in FIG. 17.

Referring to FIG. 16, a hollow cylindrical permanent magnet 1 constituting the rotor is provided with a first magnetized layer consisting of magnetized portions 1a, 1b, 1c, 1d formed by circumferentially dividing the external periphery of the magnet into n portions (4 portions in this embodiment) and alternately magnetizing such portions into S and N poles, and a second magnetized layer consisting of magnetized portions 1e, 1f, 1g, 1h formed, in an axially adjacent position, by circumferentially driving the external periphery into n portions (4 portions in the present embodiment) and magnetizing such portions alternately into S and N poles. The first and second magnetized layers are magnetized with a mutual phase displacement of 180°/n or 45°. In the first magnetized layer, the magnetized portions 1a, 1c are magnetized as S poles while 1b, 1d are magnetized as N poles, and, in the second magnetized layer, the magnetized portions 1e, 1g are magnetized as S poles while 1f, 1h are magnetized as N poles.

A rotary shaft 7, constituting the rotor shaft, is fixed to the permanent magnet 1. The rotor is constituted by the rotary shaft and the permanent magnet. Cylindrical coils 2, 3 are positioned concentrically with and on both sides in the axial direction of the permanent magnet 1, and have an external diameter substantially equal to that of the permanent magnet 1.

First and second stators 18, 19 composed of a soft magnetic material are respectively composed of an outer tube and an inner tube. Between the outer and inner tubes of the first stator 18, there is provided the coil 2, which upon energization magnetizes the first stator 18. The outer and inner tubes of the first stator 18 are formed, at an end thereof, as outer magnetic poles 18a, 18b and inner magnetic poles 18c, 18d. The inner magnetic poles 18c, 18d are mutually displaced by 360°/(n/2) or 180° so as to assume a same phase, and the outer magnetic pole 18a is provided in a position opposed to the inner magnetic poles 18c while the outer magnetic pole 18b is opposed to the inner magnetic pole 18d. The outer magnetic poles 18a, 18b and the inner magnetic poles 18c, 18d of the first stator 18 are opposed respectively to the external and internal peripheries of an end portion of the permanent magnet 1, so as to sandwich such end portion. An end portion of the rotary shaft 7 is rotatably fitted in a hole 18e of the first stator 18.

Between the outer and inner tubes of the second stator 19, there is provided the coil 3, which upon energization magnetizes the second stator 19. The outer and inner tubes of the second stator 19 are formed, at an end thereof, as outer magnetic poles 19a, 19b and inner magnetic poles 19c, 19d. The inner magnetic poles 19c, 19d are mutually displaced by 360°/(n/2) or 180° so as to assume a same phase, and the outer magnetic pole 19a is provided in a position opposed to the inner magnetic poles 19c while the outer magnetic pole 19b is opposed to the inner magnetic pole 19d. The outer magnetic poles 19a, 19b and the inner magnetic poles 19c, 19d of the second stator 19 are opposed respectively to the external and internal peripheries of an end portion of the permanent magnet 1, so as to sandwich such end portion. An end portion of the rotary shaft 7 is rotatably fitted in a hole 19e of the second stator 19.

A coupling ring 20, composed of a cylindrical member of a non-magnetic material, is provided, at an end on the internal periphery, with grooves 20a, 20b, and, at the other end, with grooves 20c, 20d which are displaced in phase by 45° from the grooves 20a, 20b. The outer magnetic poles 18a, 18b of the first stator 18 are fitted in the grooves 20a, 20b while the outer magnetic poles 19a, 19b of the second stator 19 are fitted in the grooves 20c, 20d and such fitted portions are fixed with an adhesive material to mount the first and second stators 18, 19 on the coupling ring 20.

The first and second stators 18, 19 are fixed on the coupling ring 20 so that the ends of the outer magnetic poles 18a, 18b and the inner magnetic poles 18c, 18d are respectively opposed to those of the outer magnetic poles 19a, 19b and the inner magnetic poles 19c, 19d and that the outer magnetic poles 18a, 18b and 19a, 19b are mutually separated by the width of internal projections 20e, 20f of the coupling ring 20.

FIG. 17 is a cross-sectional view of the stepping motor, and, in FIGS. 18A, 18B, 18C and 18D are cross-sectional views along a line A—A in FIG. 17, while 18E, 18F, 18G and 18H are cross-sectional views along a line B—B in FIG. 17. In FIGS. 18A and 18E are cross-sectional views at a same timing, also FIGS. 18B and 18F are those of a same timing, FIGS. 18C and 18G are those of a same timing, and FIGS. 18D and 18H are also those of a same timing.

In the following there will be explained the function of the stepping motor of the present embodiment. In a state shown in FIGS. 18A and 18E, the coils 2 and 3 are energized so as to magnetize the outer magnetic poles 18a, 18b of the first stator 18 as N poles, the inner magnetic poles 18c, 18d as S poles, the outer magnetic poles 19a, 19b of the second stator 19 as S poles and the inner magnetic poles 19c, 19d as N poles, whereby the permanent magnet 1 rotates counter-clockwise by 45° to reach a state shown in FIGS. 18B and 18F.

Then the current supply to the coil 2 is inverted to magnetize the outer magnetic poles 18a, 18b of the first stator 18 as S poles, the inner magnetic poles 18c, 18d as N poles, the outer magnetic poles 19a, 19b of the second stator 19 as S poles and the inner magnetic poles 19c, 19d as N poles, whereby the permanent magnet 1 further rotates counterclockwise by 45° to reach a state shown in FIGS. 18C and 18G.

Then the current supply to the coil 3 is inverted to magnetize the outer magnetic poles 19a, 19b of the second stator 19 as S poles, the inner magnetic poles 19c, 19d as N poles, the outer magnetic poles 18a, 18b of the first stator 18 as S poles and the inner magnetic poles 18c, 18d as N poles, whereby the permanent magnet 1 further rotates counter-clockwise by 45° to reach a state shown in FIGS. 18D and 18H. Thereafter the current supplies to the coils 2, 3 are switched in succession whereby the permanent magnet 1 rotates to positions corresponding to the phases of the current supply.

In the following there will be explained why the above-explained configuration is optimum for realizing an ultra compact stepping motor.

The basic configuration of the stepping motor is featured by:

1) hollow cylindrical structure of the permanent magnet;
2) alternate magnetization of n portions, formed by dividing the external periphery of the permanent magnet;
3) arrangement of the first coil, the permanent magnet and the second coil in the axial direction of the magnet; and
4) outer and inner magnetic poles of the first and second stators, respectively magnetized by the first and second coils, are positioned so as to respectively oppose the external and internal peripheries of the permanent magnet.

Consequently the present stepping motor only requires a diameter sufficient to position the magnetic poles of the stators outside the diameter of the magnet, and an axial length equal to the sum of the length of the permanent magnet and those of the first and second coils. As the dimension of the stepping motor is thus determined by the diameter and the length of the magnet and the coils, the motor can be made ultra compact by minimizing such diameter and length.

Such minimization of the diameter and the length of the magnet and the coils renders it difficult to maintain the accuracy of the output of the stepping motor, but this difficulty is avoided by a simple structure of forming the permanent magnet into a hollow cylindrical shape and positioning the outer and inner magnetic poles of the first and second stators so as to be respectively opposed to the external and internal peripheries of the permanent magnet of such hollow cylindrical shape. The output of the motor can be made more efficient by magnetizing not only the external periphery of the permanent magnet but also the internal periphery thereof, as in the embodiment 8 to be explained later.

[Embodiment 8]

FIGS. 19A to 19H illustrate an embodiment 8 of the present invention and shows the rotating operation of the rotor of the stepping motor. In the foregoing embodiment 7 of the present invention, the permanent magnet 1 constituting the rotor is circumferentially divided into n portions and alternately magnetized in N and S poles on the external periphery thereof, but, in the present embodiment, the permanent magnet 1 is circumferentially divided, not only on the external periphery thereof but also on the internal periphery, into n portions (4 portions in the present embodiment) and alternately magnetized into S and N. Each portion on the internal periphery of the permanent magnet 1 is magnetized in opposite manner to the adjacent portion on the external periphery thereof. More specifically the internal periphery portions corresponding to the magnetized portions 1a, 1c are magnetized as N poles while those corresponding to the magnetized portions 1b, 1d are magnetized as S poles.

In the present embodiment 8, since not only the external periphery of the permanent magnet 1 but also the internal periphery thereof are circumferentially divided into n portions and alternately magnetized as N and S poles, the output of the motor can be increased by the relationship between the internal periphery of the permanent magnet 1 and the inner magnetic poles 18c, 18d of the first stator 18 and those 19c, 19d of the second stator 19.

[Embodiment 9]

In the following there will be explained a stepping motor constituting an embodiment 9 of the present invention, with reference to FIGS. 20, 21 and 22A to 22H, wherein components the same as those in the embodiment 7 shown in FIGS. 16, 17 and 18A to 18H are represented by the same numbers. In the foregoing embodiment 7 the outer and inner tubes are integrally formed in each of the first and second stators 18, 19, but, in the present embodiment 9, the outer tubes of the first and second stators 18, 19 are integrally formed while the inner tubes of the first and second stators 18, 19 are formed separately as shown in FIG. 20.

Figure 20:
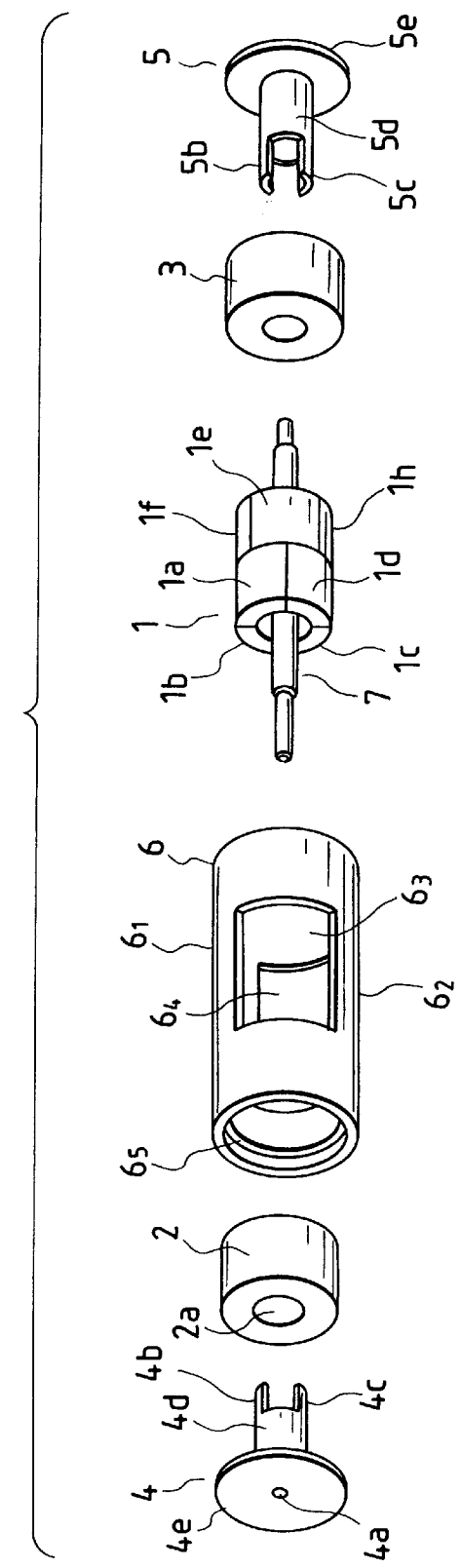
FIG. 20 is an exploded perspective view of a stepping motor of an embodiment 9 of the present invention.
Figure 21:
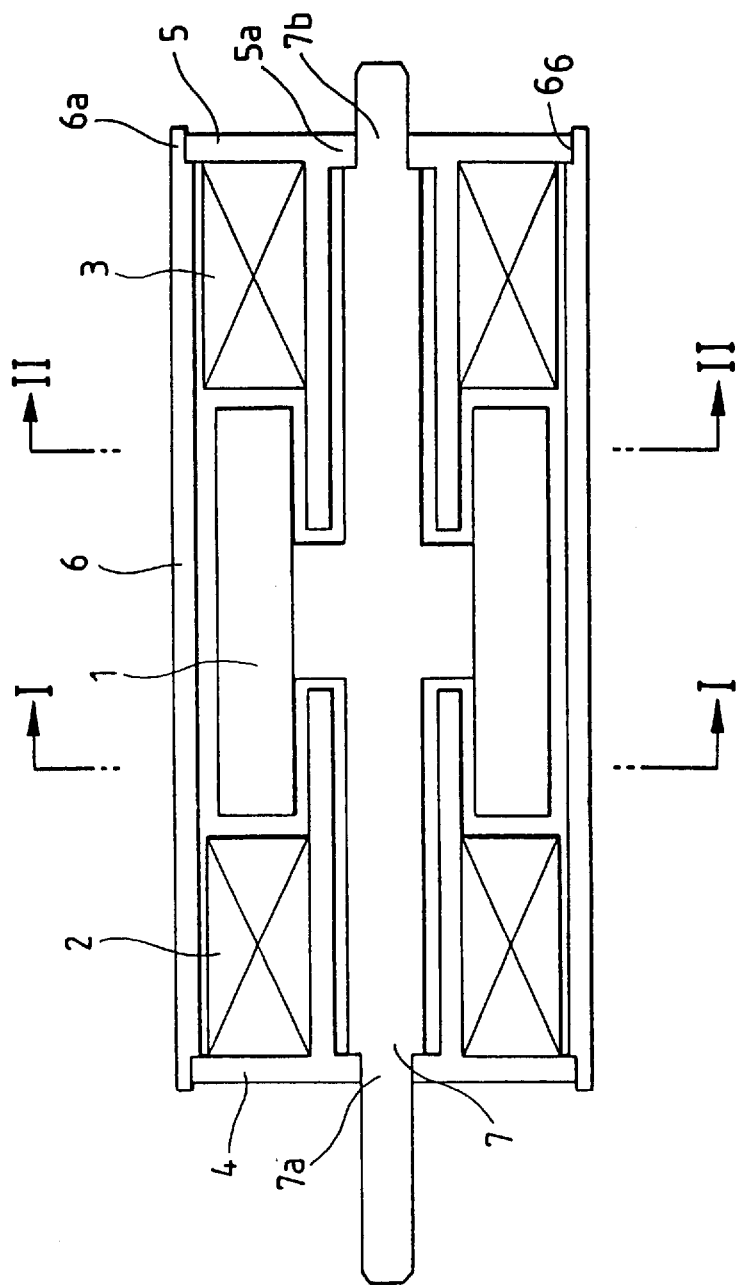
FIG. 21 is a cross-sectional view, in the assembled state, of the stepping motor shown in FIG. 20.

FIG. 20 is an exploded perspective view of the stepping motor of the embodiment 9 of the present invention, while FIG. 21 is a longitudinal cross-sectional view of the stepping motor in the assembled state, and FIGS. 22A to 22H are cross-sectional views along lines I—I and II—II in FIG. 21.

Referring to FIGS. 20, 21 and 22A to 22H, a cylindrical permanent magnet 1 is provided with a first magnetized layer consisting of magnetized portions 1a, 1b, 1c, 1d formed by dividing the circumference into n portions (4 portions in this embodiment) and alternately magnetizing such portions into S and N poles, and a second magnetized layer consisting of magnetized portions 1e, 1f, 1g, 1h formed by similarly dividing the circumference into 4 portions and magnetizing such portions alternately into S and N poles. The first and second magnetized layers are magnetized with a mutual phase displacement of 180°/n or 45°. In the present embodiment, magnetization is made in such a manner that the portions 1a, 1c of the first magnetized layer and the portions 1e, 1g of the second magnetized layer have S poles on the external periphery and N poles on the internal periphery, while the portions 1b, 1d of the first magnetized layer and the portions 1f, 1h of the second magnetized layer have N poles on the external periphery and S poles on the internal periphery.

A rotary shaft 7 is fixed to the permanent magnet 1. The rotor is constituted by the rotary shaft 7 and the permanent magnet 1. Coils 2, 3 are positioned concentrically with and on both sides in the axial direction of the permanent magnet 1, and have an external diameter substantially equal to that of the permanent magnet 1. A first yoke 4, composed of a soft magnetic material, is provided with a portion 4d to be inserted into the interior 2a of the coil 2, and teeth 4b, 4c to be opposed to the interior of the first magnetized layer of the above-mentioned permanent magnet 1. The teeth 4b, 4c are mutually displaced by 360°/(n/2) or 180°, in order to assume a same phase with respect to the poles of the first magnetized layer. A portion 7a of the rotary shaft 7 is rotatably fitted in a hole 4a of the first yoke 4.

A second yoke 5, composed of a soft magnetic material, is provided with a portion 5d to be inserted into the interior 3a of the coil 3, and teeth 5b, 5c to be opposed to the interior of the second magnetized layer of the above-mentioned permanent magnet 1. The teeth 5b, 5c are mutually displaced by 360°/(n/2) or 180°, in order to assume a same phase with respect to the poles of the second magnetized layer. A portion 7b of the rotary shaft 7 is rotatably fitted in a hole 5a of the second yoke 5.

The insertion of the coils is made easy, since the inserted portion 4d and the teeth 4b, 4c of the first yoke 4 have a same diameter and the inserted portion 5d and the teeth 5b, 5c of the second yoke 5 have a same diameter. The teeth 4b, 4c of the first yoke 4 and 5b, 5c of the second yoke 5 are in a same phase, namely in mutually opposed positions in the axial direction. A third yoke 6 is composed of a soft magnetic material. Since the coils 2, 3 and the permanent magnet 1 have substantially the same external diameters, the third yoke is constructed with a simple tubular form, so as to cover the external peripheries of the coils 2, 3 and the permanent magnet 1 with a suitable gap therebetween.

The third yoke 6 is coupled at a portion $6_5$ with a portion 4c of the first yoke 4 and at a portion $6_6$ with a portion 5e of the second yoke 5. The third yoke 6 is provided with portions $6_1, 6_2$ in a position where the teeth 4b, 4c of the first yoke 4 and those 5b, 5c of the second yoke 5 are mutually opposed across the permanent magnet 1, and with apertures $6_3, 6_4$ in other positions. As the teeth 4b, 4c of the first yoke 4 and those 5b, 5c of the second yoke 5 are of a same phase, the magnetic pole portions $6_1, 6_2$ of the third yoke 6 to be opposed to these teeth can assume a simple shape as shown in FIG. 20 and can be easily manufactured for example by pressing. Also in the structure explained above, the air gap between the first and third yokes 4, 6 and that between the second and third yokes 5, 6 are mostly filled by the permanent magnet 1, the magnetic flux generated by the energization of the coils 2, 3 is effectively applied to the permanent magnet to increase the output of the motor.

FIG. 21 is a cross-sectional view of the stepping motor, and, in FIGS. 22A, 22B, 22C and 22D are cross-sectional views along a line I—I in FIG. 21, while 22E, 22F, 22G and 22H are cross-sectional views along a line II—II in FIG. 21. In FIGS. 22A and 22E are cross-sectional views at a same timing, also FIGS. 22B and 22F are those of a same timing, FIGS. 22C and 22G are those of a same timing, and FIGS. 22D and 22H are also those of a same timing.

In the following there will be explained the function of the stepping motor of the present embodiment. In a state shown in FIGS. 22A and 22E, the coils 2 and 3 are energized so as to magnetize the teeth 4b, 4c of the first yoke 4 as S poles, the portions $6_1, 6_2$ of the third yoke 6 opposed to the teeth 4b, 4c as N poles, the teeth 5b, 5c of the second yoke as S poles, and the portions $6_1, 6_2$ of the third yoke 6 opposed to the teeth 5b, 5c as N poles, whereby the permanent magnet 1 rotates counterclockwise by 45° to reach a state shown in FIGS. 22B and 22F.

Then the current supply to the coil 2 is inverted to magnetize the teeth 4b, 4c of the first yoke 4 as N poles, the portions $6_1, 6_2$ of the third yoke 6 opposed to the teeth 4b, 4c as S poles, the teeth 5b, 5c of the second yoke as S poles, and the portions $6_1, 6_2$ of the third yoke 6 opposed to the teeth 5b, 5c as N poles, whereby the permanent magnet 1 further rotates counterclockwise by 45° to reach a state shown in FIGS. 22C and 22G.

Then the current supply to the coil 3 is inverted to magnetize the teeth 5b, 5c of the second yoke 5 as N poles, and the portions $6_1, 6_2$ of the third yoke 6 opposed to the teeth 5b, 5c as S poles, whereby the permanent magnet 1 further rotates counterclockwise by 45° to reach a state shown in FIGS. 22D and 22H. Thereafter the current supplies to the coils 2, 3 are switched in succession whereby the permanent magnet 1 rotates to positions corresponding to the phases of the current supply.

In the embodiment 9 of the present invention, the permanent magnet 1 constituting the rotor is circumferentially divided into n portions and alternately magnetized in S and N poles, not only on the external periphery but also on the internal periphery, but, in the present invention, the external periphery alone of the permanent magnet 1 constituting the rotor may be divided circumferentially into n portions and alternately magnetized in S and N poles.

[Embodiment 10]

Figure 23:
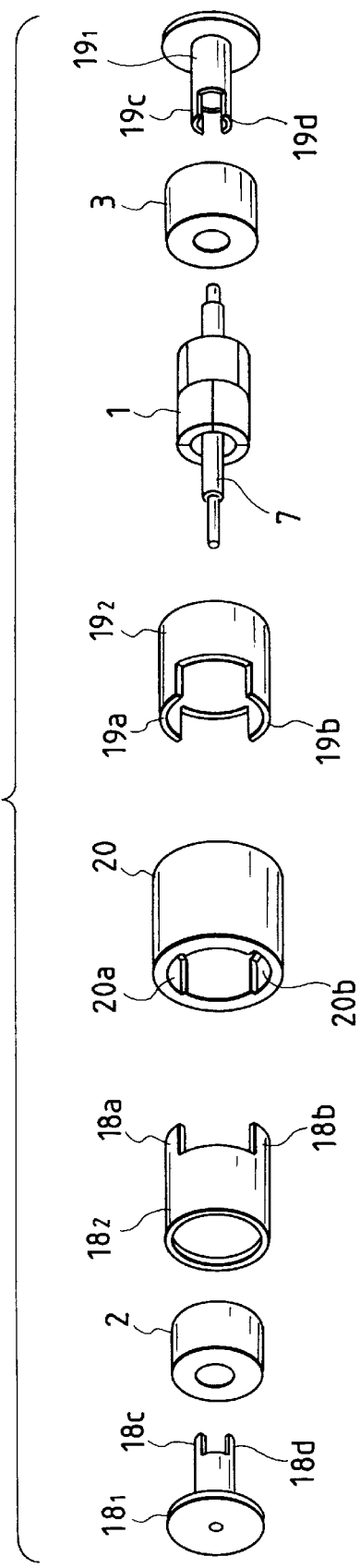
FIG. 23 is an exploded perspective view of a stepping motor of an embodiment 10 of the present invention.
Figure 24:
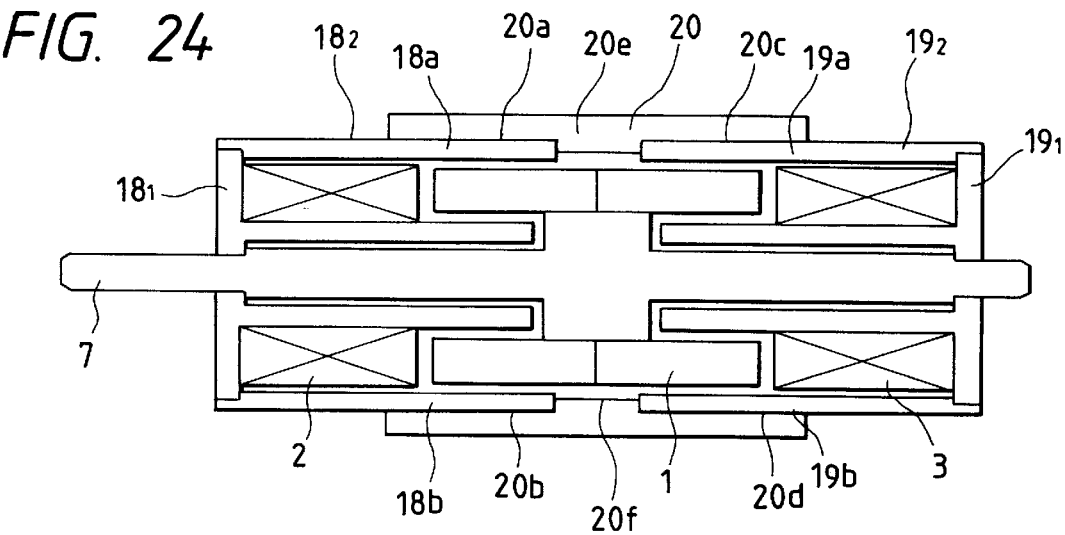
FIG. 24 is a cross-sectional view, in the assembled state, of the stepping motor shown in FIG. 23.

FIGS. 23 and 24 illustrate the stepping motor of an embodiment 10 of the present invention, wherein FIG. 23 is an exploded perspective view of the stepping motor and FIG. 24 is a cross-sectional view thereof. In contrast to the foregoing embodiment 7 where the outer and inner tubes are integrally formed in each of the first and second stators 18, 19, the outer and inner tubes in the present embodiment 10 are separately formed in each of the first and second stators 18, 19 as shown in FIGS. 23 and 24. More specifically, the inner tube of the first stator 18 constitutes, together with the inner magnetic poles 18c, 18d at the end thereof, a first yoke $18_1$, while the outer tube of the first stator 18 constitutes, together with the outer magnetic poles 18a, 18b at the end thereof, a third yoke $18_2$. Also the inner tube of the second stator 19 constitutes, together with the inner magnetic poles 19c, 19d at the end thereof, a second yoke $19_1$, while the outer tube of the second stator 19 constitutes, together with the outer magnetic poles 19a, 19b at the end thereof, a fourth yoke $19_2$. Also in the embodiment 10, the magnet 1 of the rotor may be circumferentially divided into n portions and alternately magnetized in N and S poles not only on the external periphery but also on the internal periphery as in the embodiment 8, thereby effectively increasing the output of the motor.

Figure 25:
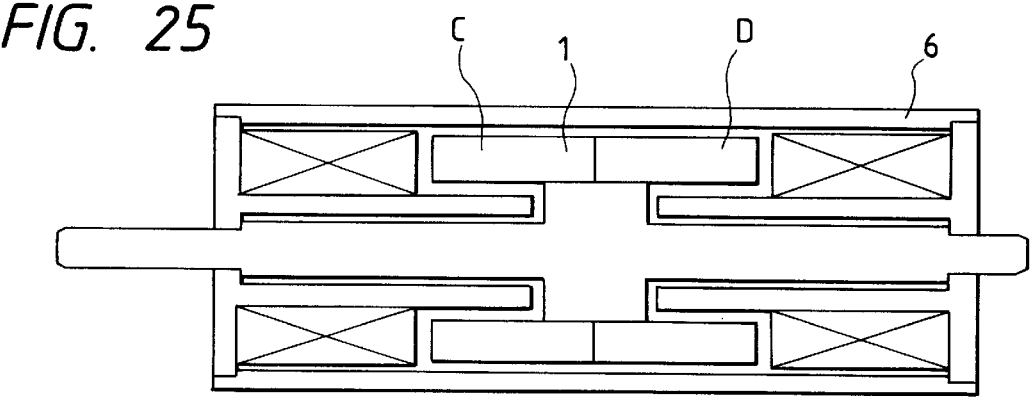
FIG. 25 is a cross-sectional view of the embodiment 9, showing the comparison with the embodiment 10.
Figure 26:
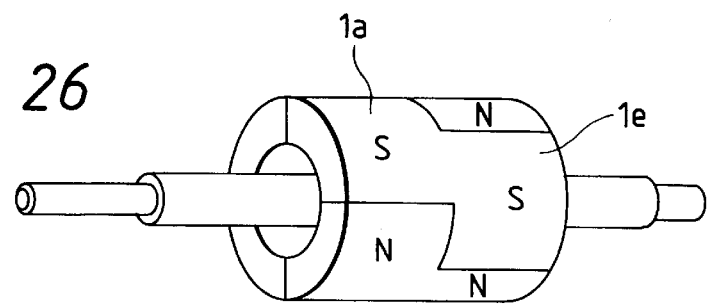
FIG. 26 is a magnified perspective view of the rotor of the stepping motor shown in FIG. 24.
Figure 27A:
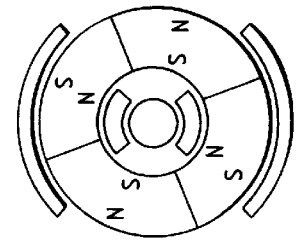
FIGS. 27A and 27B are views showing a first state of the relationship between the first and second magnetized layers of the rotor and the first and second yokes of the stepping motor shown in FIG. 24.
Figure 27B:
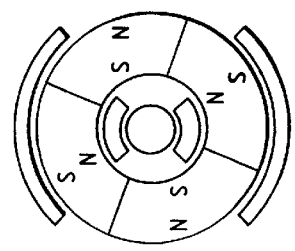
Figure 28A:
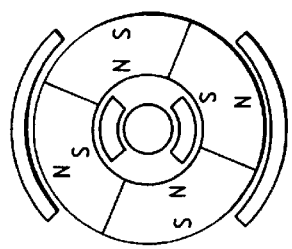
FIGS. 28A and 28B are views showing a second state of the relationship between the first and second magnetized layers of the rotor and the first and second yokes of the stepping motor shown in FIG. 24.
Figure 28B:
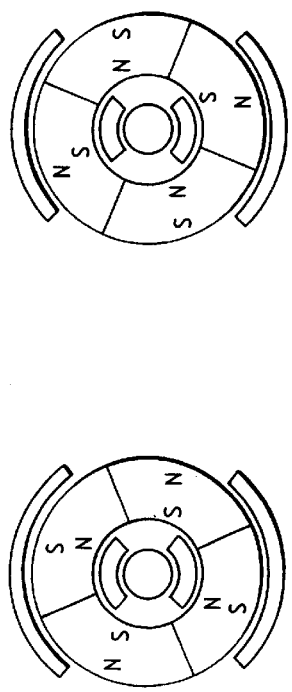
Figure 29A:
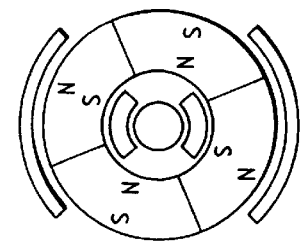
FIGS. 29A and 29B are views showing a third state of the relationship between the first and second magnetized layers of the rotor and the first and second yokes of the stepping motor shown in FIG. 24.
Figure 29B:
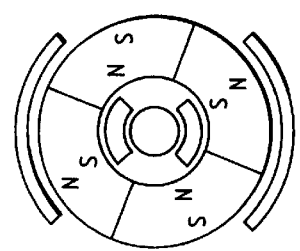
Figure 30A:
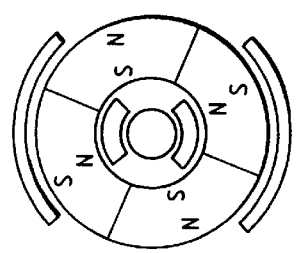
FIGS. 30A and 30B are views showing a fourth state of the relationship between the first and second magnetized layers of the rotor and the first and second yokes of the stepping motor shown in FIG. 24.
Figure 30B:
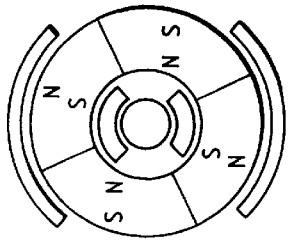
Figure 31:
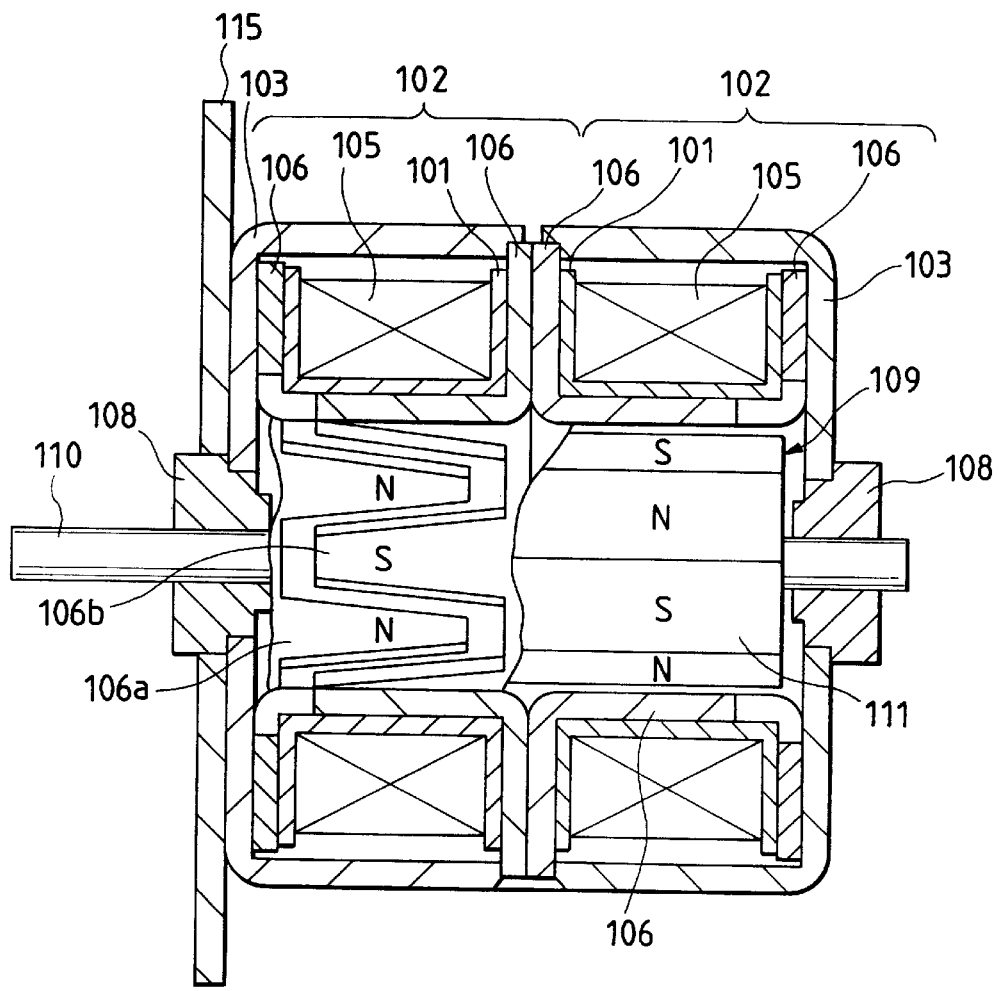
FIG. 31 is a cross-sectional view of a conventional stepping motor.
Figure 32:
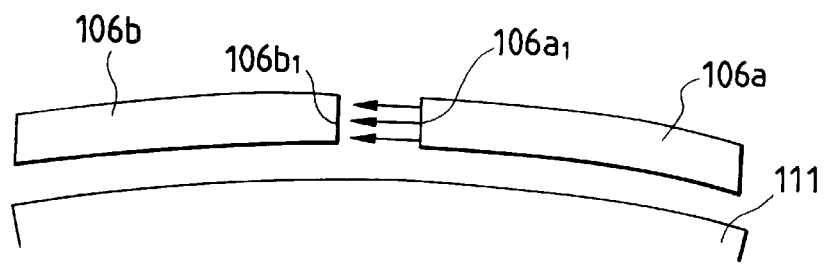
FIG. 32 is a view showing the magnetic flux in the conventional stepping motor shown in FIG. 31.

FIG. 26 is a magnified perspective view of the rotor, and FIGS. 27A, 27B, 28A, 28B, 29A, 29B, 30A and 30B are views showing rotational phases of the permanent magnet 1, wherein A indicates the first magnetized layer and B indicates the second magnetized layer. If the third yoke 6 is integrally formed as in the embodiment 9 shown in FIG. 25, there results flows of magnetic flux between the first magnetized layer C and the second magnetized layer D of the permanent magnet 1, across the third yoke 6. Consequently a cogging force becomes stronger in the rotational positions of the permanent magnet 1 shown in FIGS. 27A, 27B, 29A and 29B than in those shown in FIGS. 28A, 28B, 30A and 30B. Such phase with stronger cogging appears 4 times in a rotation, at a pitch of 90°. Since the present motor achieves a full turn by 8 switchings of the current supplied to the coils 2, 3, the electromagnetic force generated by the energization of the coils 2, 3 does not necessarily coincide with the cogging force.

For this reason the generated driving force shows significant fluctuation and the obtained rotation is not smooth. In the embodiment 10, since the third yoke $18_2$ and the fourth yoke $19_2$ are magnetically separated by a coupling ring 20 made of a non-magnetic material, there is scarcely generated the follow of magnetic flux between the first magnetized layer and the second magnetized layer across the third and fourth yokes $18_2, 19_2$, so that the cogging is generated 8 times, namely 4 times at a pitch of 90° by the first magnetized layer and 4 times of a pitch of 90°, displaced by 45°, by the second magnetized layer. As the cogging is generated at a pitch of 45°, the generated driving force shows smaller fluctuation to provide smoother rotation of the motor.

Though the foregoing embodiments have been explained by stepping motors, the present invention is not limited to such embodiments and is naturally applicable to a brushless motor by switching the current supply according to the position of the rotor for example by a hall element.

As detailed in the foregoing, the present invention provides a motor comprising a magnet which is formed in a cylindrical shape and is circumferentially divided into n portions and magnetized into different magnetic poles at least on the external periphery thereof, wherein a first coil, the magnet and a second coil are arranged in this order along the axial direction to the magnet, and first external and internal magnetic poles magnetized by the first coil are arranged so as to oppose respectively the external and internal peripheries of a magnet at an end of the magnet while second external and internal magnetic poles magnetized by the second coil are arranged so as to oppose respectively the external and internal peripheries of the magnet at the other end of the magnet. Thus there can be provided the motor of a novel configuration, which is different from the conventional configuration and is optimum for obtaining an ultra compact motor.

Also according to the present invention, a similar effect can be obtained by providing the magnet with a magnetized layer or with two magnetized layers. More specifically, the motor with such two magnetized layers comprises a permanent magnet which is formed in a cylindrical shape and is provided with a first magnetized layer formed by circumferentially dividing at least the external periphery thereof into n portions and alternately magnetizing such portions into different magnetic poles, and with a second magnetized layer formed by circumferentially dividing at least the external periphery into n portions with a phase displacement by 180°/n with respect to the first magnetized layer and alternately magnetizing such portions into different magnetic poles, wherein a first coil, the permanent magnet and a second coil are arranged in this order along the axial direction of the permanent magnet, and first external and internal magnetic poles magnetized by the first coils are arranged so as to oppose respectively the external and internal peripheries of the first magnetized layer of the permanent magnet while second external and internal magnetic poles magnetized by the second coil are arranged so as oppose respectively to the external and internal peripheries of the second magnetized layer of the permanent of the magnet.

In such motor of one-layer or two-layer structure, the diameter of the motor is determined by positioning the first and second external magnetic poles in mutually opposed manner on the external periphery of the permanent magnet, while the axial length of the motor is determined by successive positioning of the first coil, the permanent magnet and the second coil in the axial direction of the permanent magnet. Consequently the motor can be realized in an ultra compact form, and such configuration is optimum for realizing an ultra compact motor.

Also an effective motor output can be obtained by forming the permanent magnet into a hollow cylindrical shape and positioning the first and second external and internal magnetic poles respectively on the external and internal peripheries of such hollow cylindrical permanent magnet. Furthermore, since the first and second stators can be composed of a same component, there can be provided a motor which allows easy assembling and is reduced in the fluctuation of the performance.

Such motor, when applied to a lens advancing device of the camera, to provides a compact advancing device.

What is claimed is:

1. A motor comprising:
   a magnet having a cylindrical shape, circumferentially divided into n portions at least on an external periphery thereof and alternately magnetized into different magnetic poles;
   first and second coils provided in the axial direction of said magnet, and arranged across said magnet;
   a first external magnetic pole, defined by a cylindrical member having a cut-out portion, magnetized by said first coil and opposed to the external periphery of an end of said magnet;
   a first internal magnetic pole, magnetized by said first coil and opposed to an internal periphery of the end of said magnet;
   a second external magnetic pole, defined by a cylindrical member having a cut-out portion, magnetized by said second coil and opposed to the external periphery of the other end of said magnet; and
   a second internal magnetic pole, magnetized by said second coil and opposed to the internal periphery of the other end of said magnet.

2. A motor according to claim 1, wherein the internal periphery of said magnet also is circumferentially divided into n portions and alternately magnetized into different magnetic poles, which are different from those of respective adjacent portions on the external periphery of said magnet.

3. A motor according to claim 1, wherein said first external magnetic pole and said first internal magnetic pole constitute a first stator, and said second external magnetic pole and said second internal magnetic pole constitute a second stator.

4. A motor according to claim 3, wherein the first external magnetic pole of said first stator and the second external magnetic pole of said second stator are connected by a cylindrical connecting member.

5. A motor according to claim 1, wherein said first external magnetic pole and said first internal magnetic pole are arranged in a mutually opposed relationship and are displaced by 180°/n with respect to said second external magnetic pole and said second internal magnetic pole which are arranged in a mutually opposed relationship.

6. A motor according to claim 1, wherein said first and second coils are formed with an external diameter approximately equal to that of said magnet.

7. A motor according to claim 1, wherein said first internal magnetic pole is formed by a first yoke, said second internal magnetic pole is formed by a second yoke, said first external magnetic pole is formed by a third yoke, said second external magnetic pole is formed by a fourth yoke, and said first and second external magnetic poles are connected by a cylindrical connecting member.

8. A motor comprising:
   a magnet having a cylindrical form, equally divided in the circumferential direction and alternately magnetized in different magnetic poles in the radial direction;
   first and second coils provided coaxially with and at respective material ends of said magnet;
   a first tubular yoke inserted into an internal periphery of said first coil and arranged so as to oppose, with a gap therebetween, an internal periphery of said magnet;
   a second tubular yoke inserted into an internal periphery of said second coil and arranged so as to oppose, with a gap therebetween, the internal periphery of said magnet; and
   a third yoke covering an external periphery of said first yoke, an external periphery of said second yoke and an external periphery of said magnet, said third yoke having a first cut-out portion in an area where said first yoke and said magnet overlap and a second cut-out portion in an area where said second yoke and said magnet overlap.

9. A motor comprising:
   a magnet having a cylindrical form, equally divided in the circumferential direction into 2n portions and alternately magnetized in different magnetic poles in the radial direction;

first and second coils provided coaxially with and at respective ends of said magnet;

a first tubular yoke inserted into the internal periphery of said first coil and arranged so as to oppose, with a gap therebetween, the internal periphery of said magnet;

a second tubular yoke inserted into the internal periphery of said second coil and arranged so as to oppose, with a gap therebetween, the internal periphery of said magnet; and a third yoke covering the external peripheries of said first and second yokes and said magnet;

wherein said third yoke is provided, in a position where said magnet and said first yoke mutually overlap in the axial direction, with a first magnetic pole portion having a smaller internal diameter in a predetermined circumferential range, and, in a position where said magnet and said second yoke mutually overlap in the axial direction, with a second magnetic pole portion having a smaller internal diameter in a predetermined circumferential range, and said first and second magnetic pole portions are mutually displaced by 90°/n in the circumferential direction.

10. A motor according to claim 9, wherein the first and second magnetic pole portions of said third yoke are obtained by forming said third yoke inwardly thicker than in other portions of said third yoke.

11. A motor according to claim 9, wherein the first and second magnetic pole portions of said third yoke are obtained by forming inward protrusions in said third yoke that extend further inward than other portions of said third yoke.

12. A motor comprising:

a magnet having a cylindrical form, equally divided in the circumferential direction into 2n portions and alternately magnetized in different magnetic poles in the radial direction;

first and second coils provided coaxially with and at respective ends of said magnet;

a first tubular yoke inserted into the internal periphery of said first coil and arranged so as to oppose, with a gap therebetween, the internal periphery of said magnet;

a second tubular yoke inserted into the internal periphery of said second coil and arranged so as to oppose, with a gap therebetween, the internal periphery of said magnet; and a third yoke covering the external peripheries of said first and second yokes and said magnet;

wherein said third yoke is provided, in a position where said magnet and said first yoke mutually overlap in the axial direction, with a first aperture of a predetermined circumferential range, and, in a position where said magnet and said second yoke mutually overlap in the axial direction, with a second aperture of a predetermined circumferential range, and said first and second apertures are mutually displaced by 90°/n in the circumferential direction.

13. An advancing device comprising:

a motor including:

a) a magnet having a cylindrical shape, circumferentially divided into n portions at least on an external periphery thereof and alternately magnetized into different magnetic poles, said magnet having an output shaft;

b) first and second coils provided in the axial direction of said magnet, and arranged across said magnet;

c) a first external magnetic pole, defined by a cylindrical member having a cut-out portion, magnetized by said first coil and opposed to the external periphery of an end of said magnet;

d) a first internal magnetic pole, magnetized by said first coil and opposed to an internal periphery of the end of said magnet;

e) a second external magnetic pole, defined by a cylindrical member having a cut-out portion, magnetized by said second coil and opposed to the external periphery of the other end of said magnet; and f) a second internal magnetic pole, magnetized by said second coil and opposed to the internal periphery of the other end of said magnet;

conversion means for converting the rotary motion of the output shaft of the magnet of the motor into a linear motion; and a linearly movable member to be linearly driven by the linear motion of said conversion means.

14. An advancing device according to claim 13, wherein said linearly movable member is fixed to a lens holder for supporting a lens.

15. An advancing device comprising:

a motor including:

a) a magnet having a cylindrical form, equally divided in the circumferential direction and alternately magnetized in different magnetic poles in the radial direction;

b) first and second coils provided coaxially with and at respective ends of said magnet;

c) a first tubular yoke inserted into an internal periphery of said first coil and arranged so as to oppose, with a gap therebetween, the internal periphery of said magnet;

d) a second tubular yoke inserted into an internal periphery of said second coil and arranged so as to oppose, with a gap therebetween, the internal periphery of said magnet; and e) a third yoke covering the external periphery of said first yoke, the external periphery of said second yoke and the external periphery of said magnet, said third yoke having a first cut-out portion in an area where said first yoke and said magnet overlap and a second cut-out portion in an area where said second yoke and said magnet overlap;

conversion means for converting the rotary motion of the output shaft of the magnet of the motor into a linear motion; and a linearly movable member to be linearly driven by the linear motion from said conversion means.

16. An advancing device comprising:

a motor including:

a) a magnet having a cylindrical form, equally divided in the circumferential direction and alternately magnetized in different magnetic poles in the radial direction;

b) first and second coils provided coaxially with and at respective ends of said magnet;

c) a first tubular yoke inserted into an internal periphery of said first coil and arranged so as to oppose, with a gap therebetween, the internal periphery of said magnet;

d) a second tubular yoke inserted into an internal periphery of said second coil and arranged so as to oppose, with a gap therebetween, the internal periphery of said magnet; and e) a third yoke covering the external periphery of said first yoke, the external periphery of said second yoke and the external periphery of said magnet, said third yoke having a first cut-out portion in an area where said first yoke and said magnet overlap and a second cut-out portion in an area where said second yoke and said magnet overlap;

conversion means for converting the rotary motion of the output shaft of the magnet of the motor into a linear motion, wherein said conversion means includes first screw means provided on the output shaft of said magnet, second screw means provided on said linearly movable means and engaging said first screw means, and limiting means provided between said linearly movable means and said first or second yoke so as to enable linear motion of said linearly movable for inhibiting rotation thereof; and a linearly movable member to be linearly driven by the linear motion from said conversion means.

17. An advancing device according to claim 15, wherein said linearly movable member is fixed to a lens holder for supporting a lens.

18. A motor comprising:

a magnet having a cylindrical form, provided with a first magnetized layer divided in the circumferential direction at least on the external periphery into n portions and alternately magnetized in different magnetic poles, and a second magnetized layer divided in the circumferential direction at least on the external periphery, in an axially adjacent position, into n portions and alternately magnetized in different magnetic poles;

first and second coils provided coaxially with and at respective ends of said magnet;

a first external magnetic pole defined by a cylindrical member having a cut-out portion, magnetized by said first coil and opposed to the external periphery of the first magnetized layer of said magnet;

a first internal magnetic pole magnetized by said first coil and opposed to the internal periphery of the first magnetized layer of said magnet;

a second external magnetic pole defined by a cylindrical member having a cut-out portion, magnetized by said second coil and opposed to the external periphery of the second magnetized layer of said magnet; and a second internal magnetic pole magnetized by said second coil and opposed to the internal periphery of the second magnetized layer of said magnet.

19. A motor according to claim 18, wherein the internal periphery of the first magnetized layer and the internal periphery of the second magnetized layer of said magnet each are circumferentially divided into n portions and alternately magnetized into different magnetic poles, which are different from those of respective adjacent portions on the external peripheries.

20. A motor according to claim 18, wherein said first external magnetic pole and said first internal magnetic pole are provided respectively opposed to said second external magnetic pole and said second internal magnetic pole.

21. A motor according to claim 18, wherein said first external magnetic pole and said first internal magnetic pole constitute a first stator, and said second external magnetic pole and said first internal magnetic pole constitute a second stator.

22. A motor according to claim 21, wherein the first external magnetic pole of said first stator and the second external magnetic pole of said second stator are connected by a cylindrical connecting member.

23. A motor according to claim 18, wherein said first and second coils are formed with an external diameter approximately equal to that of said magnet.

24. A motor according to claim 18, wherein said first internal magnetic pole is formed by a first yoke, said second internal magnetic pole is formed by a second yoke, said first external magnetic pole is formed by a third yoke, said second external magnetic pole is formed by a fourth yoke, and said first and second external magnetic poles are connected by a cylindrical connecting member.

25. A motor comprising:

a magnet having a cylindrical form, provided with a first magnetized layer divided in the circumferential direction at least on an external periphery into n portions and alternately magnetized in different magnetic poles, and a second magnetized layer divided in the circumferential direction at least on the external periphery, in an axially adjacent position, into n portions and alternately magnetized in different magnetic poles;

first and second coils provided coaxially with and at respective ends of said magnet;

a first tubular yoke inserted into an internal periphery of said first coil and arranged so as to oppose, with a gap therebetween, the internal periphery of the first magnetized layer of said magnet;

a second tubular yoke inserted into an internal periphery of said second coil and arranged so as to oppose, with a gap therebetween, the internal periphery of the second magnetized layer of said magnet; and a third yoke covering the external peripheries of said first yoke, the external periphery of said second yoke and the external periphery of said magnet, said third yoke having a first cut-out portion in an area where said first yoke and said magnet overlap and a second cut-out portion in an area where said second yoke and said magnet overlap.

26. A motor comprising:

a magnet having a cylindrical form, provided with a first magnetized layer divided in the circumferential direction at least on the external periphery into n portions and alternately magnetized in different magnetic poles, and a second magnetized layer divided in the circumferential direction at least on the external periphery, in an axially adjacent position, into n portions and alternately magnetized in different magnetic poles;

first and second coils provided coaxially with and at respective ends of said magnet;

a first tubular yoke inserted into an internal periphery of said first coil and arranged so as to oppose, with a gap therebetween, the internal periphery of the first magnetized layer of said magnet;

a second tubular yoke inserted into an internal periphery of said second coil and arranged so as to oppose, with a gap therebetween, the internal periphery of the second magnetized layer of said magnet; and a third yoke having a cylindrical shape and including a cut-out portion defining a magnetic pole portion, said third yoke being connected at an end to said first yoke, covering the external periphery of said first yoke, the magnetic pole portion being located at the other end and opposed to the external periphery of the first magnetized layer of said magnet;

a fourth yoke having a cylindrical shape and including a cut-out portion defining a magnetic pole portion, said fourth yoke being connected at an end to said second yoke, covering the external periphery of said second yoke the magnetic pole portion being located at the other end and opposed to the external periphery of the second magnetized layer of said magnet; and a connecting member for concentrically supporting said third and fourth yokes.

* * * * *

UNITED STATES PATENT AND TRADEMARK OFFICE
CERTIFICATE OF CORRECTION

PATENT NO. : 5,831,356

DATED : November 3, 1998

INVENTOR(S): CHIKARA AOSHIMA

It is certified that error appears in the above-identified patent and that said Letters Patent is hereby corrected as shown below:

COLUMN 4:

Line 41, "and," should read --and--.

COLUMN 5:

Line 21, "oppose to" should read --oppose--.
Line 62, "are" should read --is--.

COLUMN 6:

Line 3, "contract" should read --contrast--.
Line 45, "so" should read --so as--.

COLUMN 14:

Line 52, "the follow" should read --a flow--.
Line 56, "of" (1st occurence) should read --at--.
Line 64, "hall" should read --Hall--.

UNITED STATES PATENT AND TRADEMARK OFFICE
CERTIFICATE OF CORRECTION

PATENT NO. : 5,831,356

DATED : November 3, 1998

INVENTOR(S) : CHIKARA AOSHIMA

It is certified that error appears in the above-identified patent and that said Letters Patent is hereby corrected as shown below:

COLUMN 15:

Line 37, "permanent of the" should read --permanent--.
Line 59, "to" should be deleted.

COLUMN 16:

Line 50, "material" should be deleted.

COLUMN 19:

Line 12, "said" should be deleted.
Line 15, "movable" should read --movable means and--.

COLUMN 21:

Line 2, "yoke" should read --yoke,--.

Signed and Sealed this

Fifteenth Day of June, 1999

Attest:

Q. TODD DICKINSON

*Attesting Officer*  *Acting Commissioner of Patents and Trademarks*